(12) United States Patent
Hanaoka et al.

(10) Patent No.: US 8,564,811 B2
(45) Date of Patent: Oct. 22, 2013

(54) METHOD AND APPARATUS FOR DISTRIBUTING A LOCKED PRINT JOB

(75) Inventors: Nobutaka Hanaoka, West New York, NJ (US); Jayasimha Nuggehalli, Cupertino, CA (US)

(73) Assignees: Ricoh Company, Ltd., Tokyo (JP); Ricoh Americas Corporation, Cupertino, CA (US)

( * ) Notice: Subject to any disclaimer, the term of this patent is extended or adjusted under 35 U.S.C. 154(b) by 1078 days.

(21) Appl. No.: 12/457,070

(22) Filed: Jun. 1, 2009

(65) Prior Publication Data

US 2010/0302575 A1 Dec. 2, 2010

(51) Int. Cl.
*G06F 3/12* (2006.01)
*G06F 7/04* (2006.01)
*G06K 15/00* (2006.01)
*H04N 1/00* (2006.01)
*H04Q 9/00* (2006.01)

(52) U.S. Cl.
USPC ......... 358/1.15; 358/1.14; 358/402; 358/403; 726/4; 726/26; 726/27; 340/5.81

(58) Field of Classification Search
None
See application file for complete search history.

(56) References Cited

U.S. PATENT DOCUMENTS 7,249,900 B1 7/2007 Katano et al.
2007/0008581 A1 * 1/2007 Han .............................. 358/1.15

FOREIGN PATENT DOCUMENTS

WO WO 0068817 A1 * 11/2000

OTHER PUBLICATIONS

U.S. Appl. No. 12/504,390, filed Jul. 16, 2009, Nuggehalli, et al.
U.S. Appl. No. 12/388,238, filed Feb. 18, 2009, Hanaoka, et al.

* cited by examiner

*Primary Examiner* — Thomas Lett
(74) *Attorney, Agent, or Firm* — Oblon, Spivak, McClelland, Maier & Neustadt, L.L.P.

(57) ABSTRACT

A method, apparatus, and system for outputting a locked print job by a printing device connected to a client terminal over a network. The method includes receiving a request to distribute the locked print job to one or more users. The locked print job is generated in response to the request, and the locked print job and information identifying the one or more users is transmitted to the printing device over the network. The printing device receives the locked print job and the information identifying the one or more users transmitted by the client terminal, and stores the locked print job, the information identifying the one or more users, and authentication information. The authentication information is transmitted to the one or more users. The printing device outputs the locked print job, when the authentication information is entered into the printing device.

13 Claims, 25 Drawing Sheets

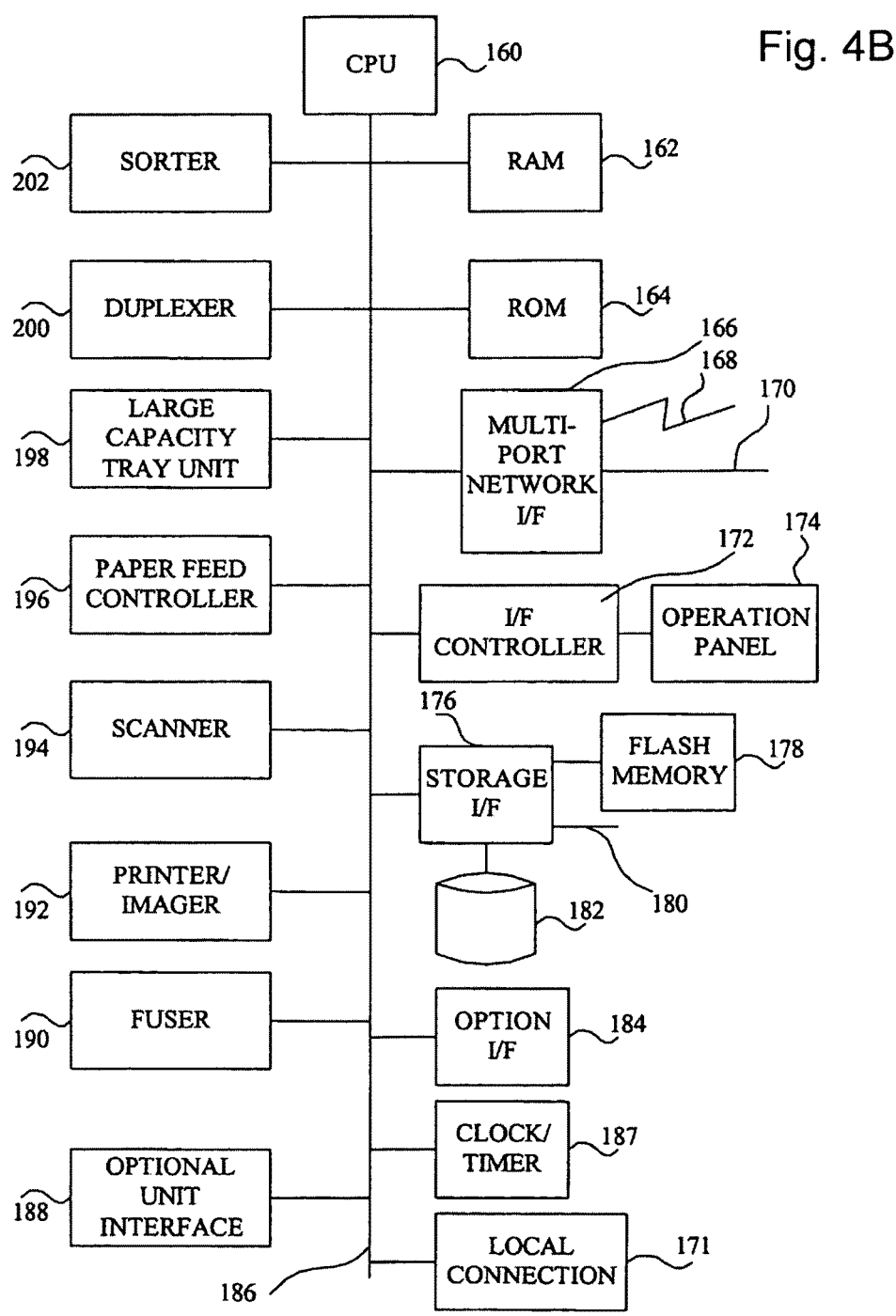

Locked Print Details — 1060

User ID: _____ 1062

Password: _____ 1064

☐ Delegate or Distribute — 1066    [Delegate Details] — 1068

[OK]    [Cancel]    [Help]

Locked Print Delegation Details — 1080

Email ID: _____ 1082

Password: _____ 1084

☐ Auto Generate Password — 1086

User/Group Email Address List — 1088
- accounts@acme.com
- accountsrec@acme.com

[LDAP Server1] — 1090    [LDAP Server2] — 1092

Search Condition

Name: acc — 1094

Email Address: _____ 1096

[Search] — 1098

[OK]    [Cancel]    [Help]

Figure 11D

```
Example: Group ID
@PJL comment delegated job
@PJL SET USERID="accountdept@acme.com"
          [Example]
@PJL SET JOBPASSWORD3="AUkxcAAARWFizJw"     [Encrypted password]
Or
Example: Individual ID
@PJL comment delegated job
@PJL SET USERID="john@acme.com"
          [Example]
@PJL SET JOBPASSWORD3="AUkxcBBAARWFizJw"    [Encrypted password]
```

METHOD AND APPARATUS FOR DISTRIBUTING A LOCKED PRINT JOB

CROSS-REFERENCE TO RELATED APPLICATION

This application is related to the following commonly owned co-pending U.S. patent application:

U.S. patent application Ser. No. 12/388,238 entitled "Method and Apparatus for Printing a Locked Print Job," filed Feb. 18, 2009, which is incorporated herein by reference in its entirety.

BACKGROUND OF THE INVENTION

1. Field of the Invention

The present invention relates generally to printing a locked print job. The present invention is more particularly related to distributing the locked print job to one or more users.

2. Description of the Related Art

In environments such as an office or computer lab, computers may be connected to one or more printers shared over a network. To print a document, a computer user typically transmits a request to print the document to one of the shared printers. The shared printer prints the document, in response to the print request, and the computer user retrieves the printed document from the shared printer.

However, in such environments, it is difficult to maintain confidentiality of the printed document. For example, it is difficult to prevent other users from viewing the printed document between the time the document is printed by the printer and when the printed document is retrieved by the computer user.

Accordingly, a printing device may be configured to require that a password be entered, before the printing device permits the document to be printed. FIG. 1 illustrates an approach for implementing locked printing on a printing device, as disclosed in U.S. Pat. No. 7,249,900, which is incorporated by reference in its entirety. As illustrated in FIG. 1, locked printing is initiated by a user at a client device in step S2. The user specifies a user ID and password data corresponding to the locked printing. Next, print data is generated and transmitted to the printing device in steps S4 and S6, respectively. In the printing device, the print data is processed by a locked print process in step S8, and stored on the printing device if locked printing is specified in step S10. Then, the user accesses the printing device and selects the locked printing option in step S12. The user selects the user ID and enters the corresponding password data in step S14. When the password data is authenticated in step S16, a list of print data associated with the authenticated user ID/password pair is presented in step S18. The user may select one of or more of the listed print data and perform an action (e.g., print or delete) in step S20.

However, since the user ID and corresponding password data are required to act on the print data, only the user who specifies the user ID and password data can unlock the print request and retrieve the printed document from the printing device. Further, it is difficult for a user to distribute a printing job to his/her team members without the user sharing his/her password and user ID. Thus, the user cannot conveniently distribute the locked printing to one or more users.

SUMMARY OF THE INVENTION

Accordingly, an object of the present invention is to provide a printer driver that simplifies and automates the delegation of a print job to another member of a team. Another object of the invention is to provide a printer driver that simplifies secure distribution of the print job to several members of the team.

According to an embodiment of the present invention, a method is provided for printing a locked print job by a printing device connected to a client terminal over a network. The method includes receiving, in the client terminal, a request to distribute the locked print job to one or more users, the request including information identifying the one or more users. The client terminal generates the locked print job in response to the request, and transmits the locked print job and the information identifying the one or more users to the printing device over the network. The printing device receives the locked print job and the information identifying the one or more users transmitted by the client terminal. Further, the printing device stores the locked print job, the information identifying the one or more users, and authentication information. The authentication information is configured to unlock the locked print job when entered into the printing device, and is transmitted to the one or more users. The method further includes outputting, by the printing device, the locked print job, when the authentication information is entered into the printing device.

Further, according to another embodiment of the present invention, there is provided a method for a printing device to print a locked print job. The method includes receiving the locked print job and information identifying one or more users designated to receive the locked print job from a client terminal. The locked print job, the information identifying the one or more users, and authentication information are stored in a memory. The authentication information is configured to unlock the locked print job when entered into the printing device. Further, the locked print job is outputted, when the authentication information is inputted into the printing device.

According to another embodiment of the invention, there is provided a printing device. The printing device includes means for receiving the locked print job and information identifying one or more users designated to receive the locked print job from a client terminal; means for storing, in a memory, the locked print job, the information identifying the one or more users, and authentication information, the authentication information being configured to unlock the locked print job when entered into the printing device; and means for outputting the locked print job, when the authentication information is inputted into the printing device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4B illustrates electronic components of the printing device illustrated in FIG. 4A;

FIGS. 11A-11D are screenshots of exemplary interfaces that may be used to distribute the locked print job requested using the client device;

FIG. 12 illustrates exemplary PJL commands/comments that are used when a locked print job is to be distributed to one or more users;

FIGS. 16A-16C are screenshots of exemplary interfaces for allowing a user to access the locked print job in the printing device.

DETAILED DESCRIPTION OF THE PREFERRED EMBODIMENTS

Figure 1:
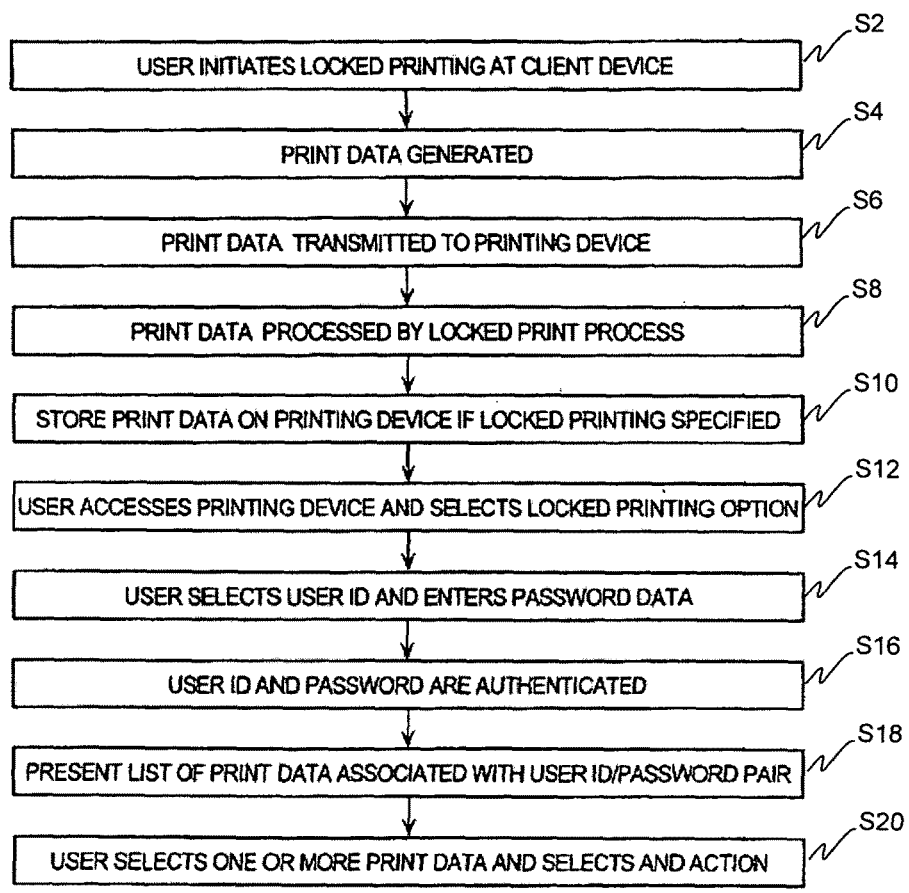
FIG. 1 illustrates a flow diagram for a locked print process.
Figure 2:
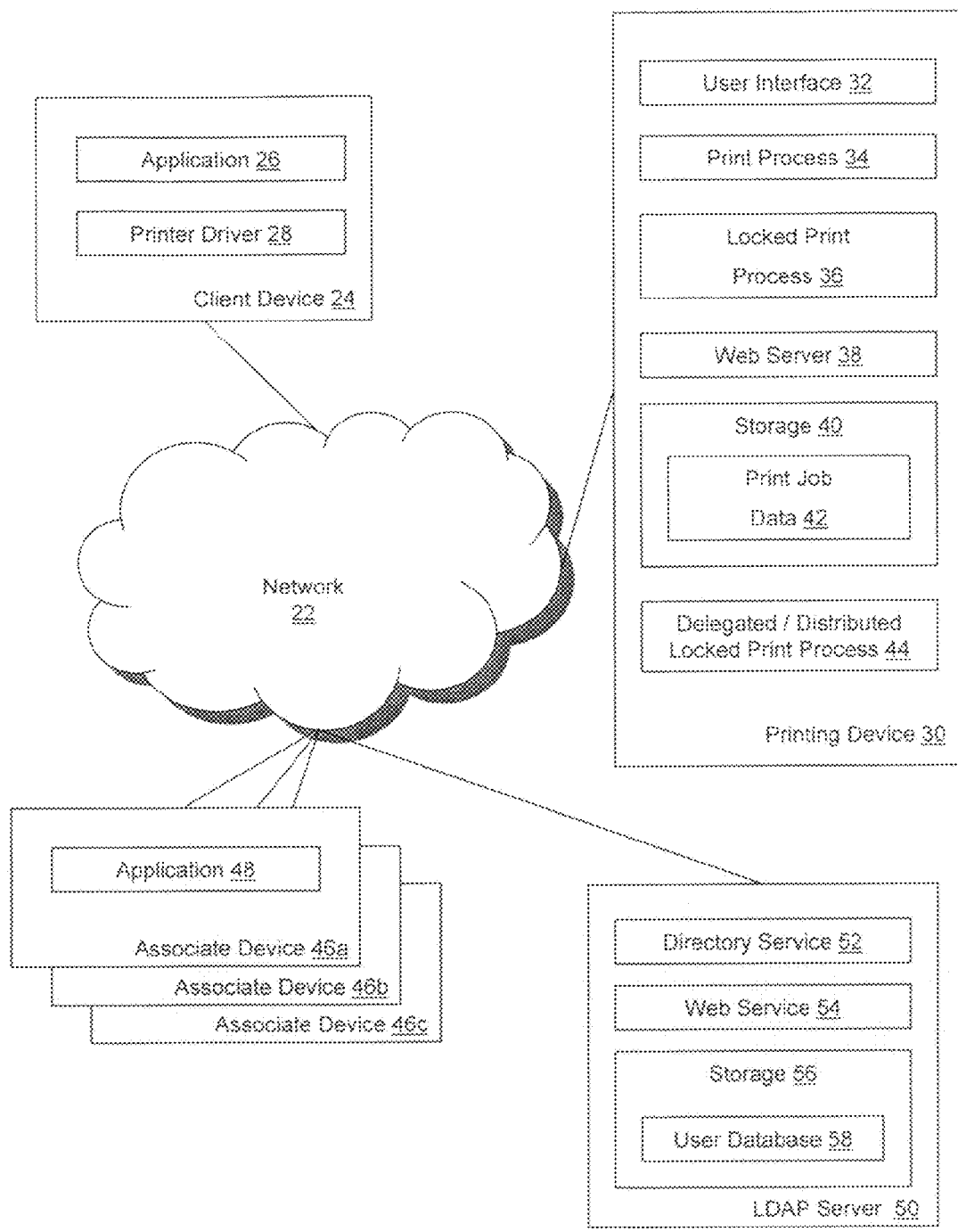
FIG. 2 illustrates an exemplary network structure including a client device, printing device, one or more assistant devices, and a Lightweight Directory Access Protocol (LDAP) server connected over a network.

Referring now to the drawings, wherein like reference numerals designate identical or corresponding parts throughout the several views, FIG. 2 is a block diagram that shows an arrangement for implementing distributed (or delegated) locked printing on a printing device according to one embodiment of the invention. Using the arrangement of FIG. 2, a user may distribute or delegate the locked printing to one or more users, as further discussed below. The one or more users to which the locked printing is distributed or delegated may include, for example, team members, co-workers, or classmates of the user distributing or delegating the locked printing.

As illustrated in FIG. 2, a client device 24, printing device 30, one or more associate devices 46 (e.g. three associate devices 46a-46c), and a Lightweight Directory Access Protocol (LDAP) server 50 are connected to each other over a network 22, such as a Local Area Network (LAN), Wide Area Network (WAN), or Wireless Local Area Network (WLAN). It is noted that the client device 24, printing device 30, one or more associate devices 46, and LDAP server 50 need not be connected to each other over the same network, and may, for example, be connected to each other by any combination of different communications paths (e.g., the Internet, a LAN, or mobile network).

The client device 24 may include an application 26 and printer driver 28. Application 26 may be any type of application executed on the client device 24. The application 26 may include one or a combination of, for example, a word processing application, spreadsheet application, e-mail client, web browser, portable document format (PDF) viewer, image viewing/editing software, or any other application configured to generate data for processing by the printing device 30. The printer driver 28 is configured to provide a user interface to set up the distributed locked printing, as further discussed below. Further the printer driver 28 is configured to process the data from the application 26 and generate print data that is provided to the printing device 30 for processing.

Figure 11A:
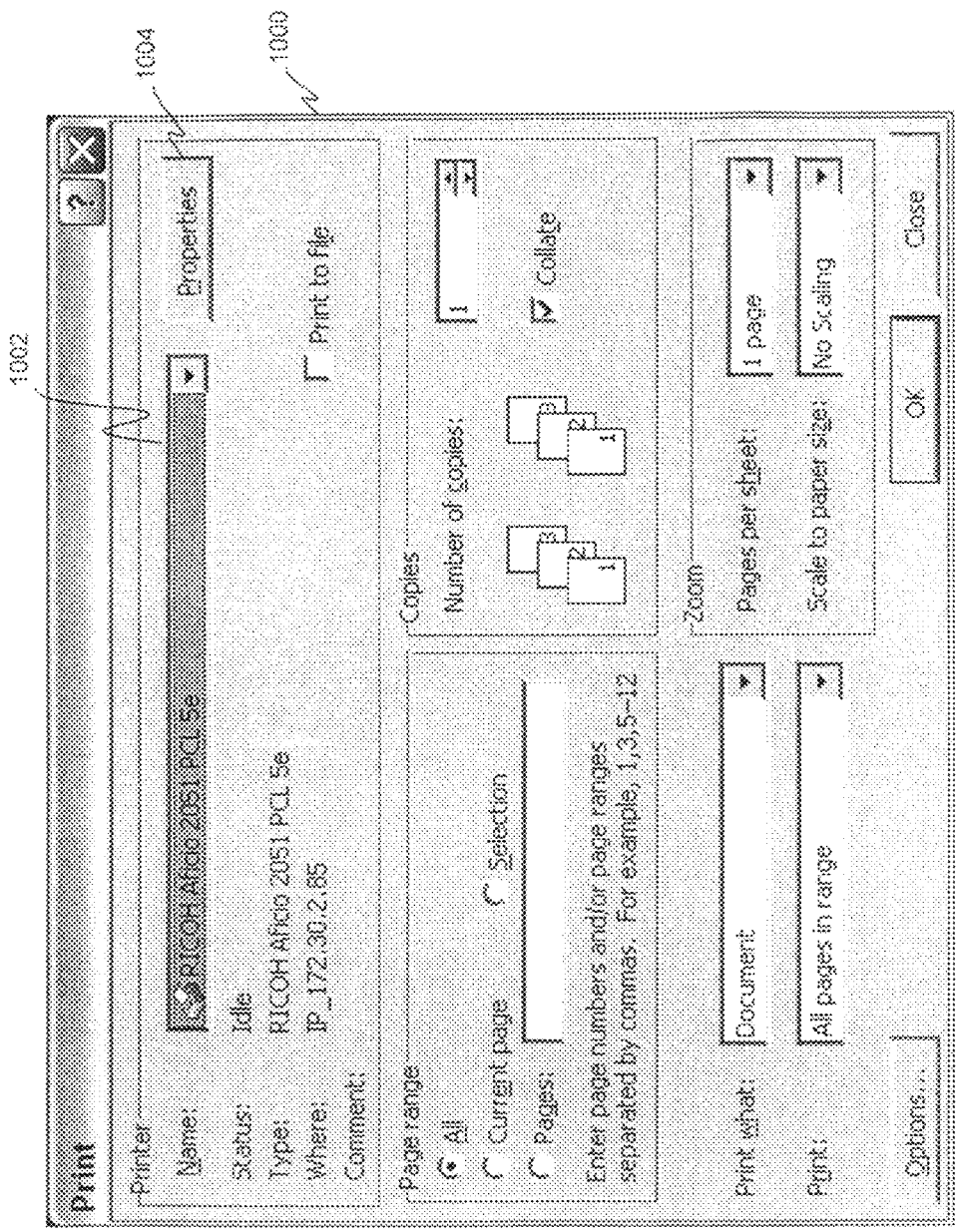
Figure 11B:
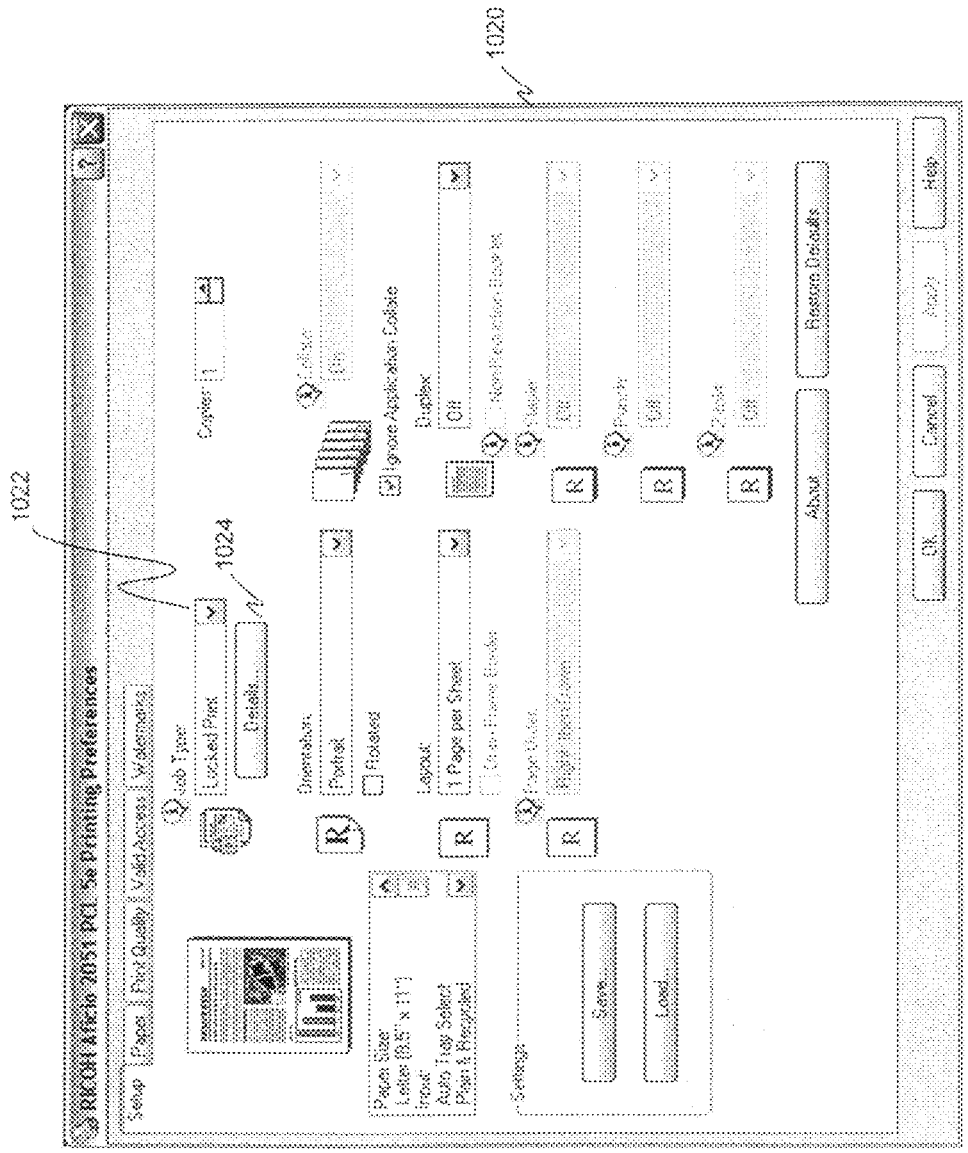

The client device 24 may display user interfaces such as those illustrated in FIGS. 11A-11D. For example, in FIG. 11A, a Print window 1000 is displayed to a user of the client device 24. The user selects a printer to process a print job in a drop down window 1002. If the user selects the properties button 1004, a Printing Preferences window 1020, as illustrated in FIG. 11B, is displayed. The Printing Preferences window 1020 allows the user to define several printing options, including whether the type of the print job corresponds to a locked or unlocked printing in a drop down window 1022. For the locked printing, the user may define further details by, for example, selecting the details button 1024.

When the selects the details button 1024, a Locked Print Details window 1060 is displayed. The Locked Print Details window 1060 provides fields for the user to enter a user ID and password to be associated with the print job, as illustrated in FIG. 11C. The Locked Print Details window 1060 further includes a Delegate or Distribute option 1066 to distribute the locked printing to one or more users. By checking (or otherwise selecting) the Delegate or Distribute option 1066, a user has the option to delegate a print job for pickup to another member or to distribute the print job to a group. In one embodiment, when the Delegate or Distribute option 1066 is checked (or otherwise selected), the user is prevented from editing the user ID field 1062 and password field 1064, and the user ID and password are automatically generated by the client device 24. Alternatively, the user may be permitted to manually enter the user ID and password.

The user may further define parameters of the distributed locked printing by selecting delegate details button 1068. The client device displays a Locked Print Delegation Details window 1080, illustrated in FIG. 11D, when the delegate details button 1068 is selected by the user. Using the Locked Print Delegation Details window 1080, the user of the client device 24 can search for a user or group using a LDAP server. Further, the user may enter information identifying one or more users to whom the locked print job is to be distributed in the E-mail ID field 1082. The user may select the one or more users from the User/Group E-mail Address List 1088. In alternative embodiments, the information identifying the one or more users may be automatically entered by the client device 24, or manually entered by the user.

As illustrated in FIG. 11D, the information identifying the one or more users may be an e-mail address of a single user or a group of users. However, other types of information may be used to identify the one or more users including, for example, any one or a combination of telephone numbers, network identifiers, user IDs, group IDs, instant messaging identifiers, look-up table identifiers, or other identifiers that may be used to communicate with the one or more users. Moreover, the information identifying the one or more users may be preset in the client device 24 or the printing device 30. When the information identifying the one or more users is preset in the printing device 30, the information identifying the one or more users may be replaced with information identifying the user distributing the locked print job. The user distributing the locked print job may also be identified using any of the identification information discussed above.

The printing device 30 may include a user interface 32, print process 34, locked print process 36, web server 38, storage 40 storing print job data 42, and delegated/distributed locked print process 44. The user interface 32 may be any mechanism and/or medium that provides for the exchange of information between a user and the printing device 30. The print process 34 may be implemented by one or more processes for printing the print job received from the client device 24. The locked print process 36 is a process for processing a locked print job. The web server 38 may be implemented by any mechanism or process for generating Web pages, which allows an administrator to manage, or access information on, the printing device 30. For example, the administrator may access the web server 38 to manage (e.g., edit, delete, or add) pending print jobs stored in the printing device 30, and/or to configure the manner in which the printing device 30 processes a locked print request. Further, the administrator may access the web server 38 to retrieve a job log stored on the printing device 30, as further discussed below. The storage 40 is configured to store the print job data 42 received from the client device 24. Further, the delegated/distributed locked print process 44 determines whether the print job received from the client device 24 is to be distributed, and to forward information associated with the distributed print job to the one or more users, as further discussed below.

The one or more associate devices 46, which are associated with the one or more users, may each include an application 48 configured to receive authentication information (e.g., password data) and, if necessary, other information such as a user ID or any other identifier associated with the locked print job (e.g., a document name), to unlock locked print job data stored in the printing device 30. The associate devices 46 may receive the authentication information and/or the other information from the client device 24 or the printing device 30. When the authentication information is sent by the printing device 30, receipt of the print job by the printing device 30 can be confirmed. Alternatively, receipt can also be confirmed if the printing device 30 sends an acknowledgement to the client device 24, that the print job has been received, before the client device 24 sends the authentication information to the associate devices 46.

The LDAP server 50 may include a directory service 52, a web service 54, and a storage 56 that stores a user database 58. The directory service 52 interfaces with the user database 58 to provide information regarding a plurality of users, from which the one or more users to whom the locked print job should be distributed may be selected. In one embodiment, the directory service 52 provides the information regarding the plurality of users to the client device 24, which accesses the LDAP server 50 via the web service 54. In an exemplary embodiment, the user database 58 stores individual and/or group e-mail addresses. However, the user database 58 is not so limited, and may store any other type of information that identifies the plurality of users, as discussed above.

Figure 3:
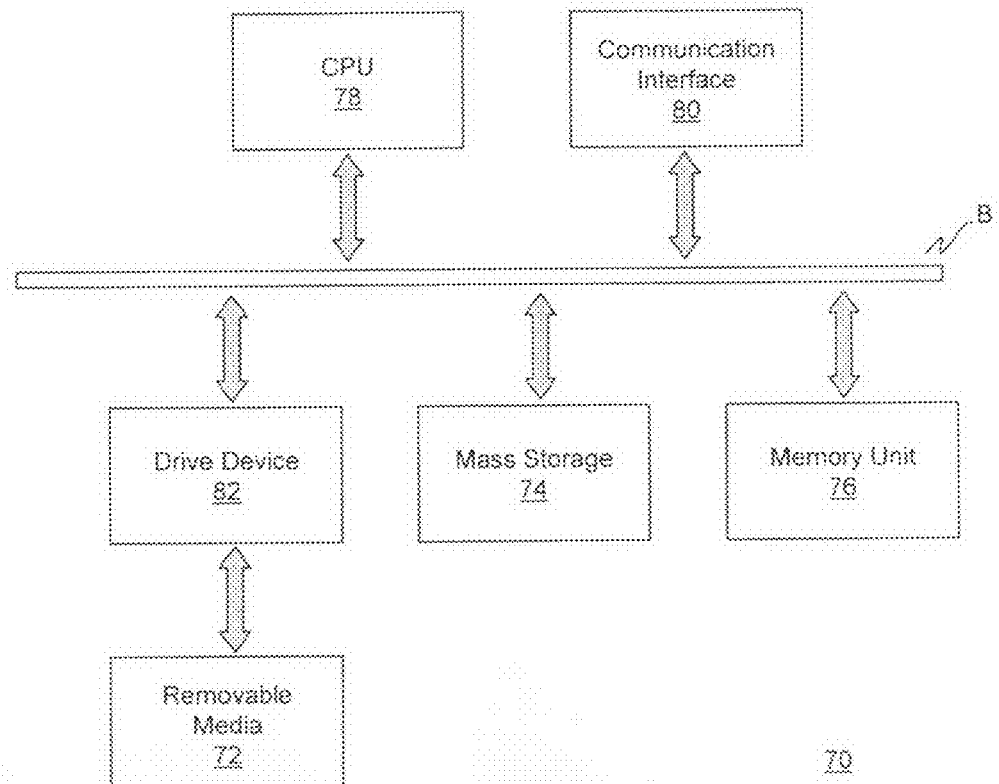
FIG. 3 illustrates hardware components of one embodiment of the client device, the one or more assistant devices, and the LDAP server.

FIG. 3 illustrates a computer system 70 upon which embodiments of the client device 24, one or more associate devices 46, and LDAP server 50 may be implemented. The client device 24, one or more associate devices 46, and LDAP server 50 may be implemented in, for example, workstations, personal computers, laptop computers, personal digital assistants (PDAs), cellular telephone devices, or other mobile devices. The computer system 70 includes a bus B or other communication mechanism for communicating information such as address information and data, and a processor/CPU 78 coupled with the bus B for processing the information. The computer system 70 also includes a main memory/memory unit 76, such as a random access memory (RAM) or other dynamic storage device (e.g., dynamic RAM (DRAM), static RAM (SRAM), and synchronous DRAM (SDRAM)), coupled to the bus B for storing information and instructions to be executed by the CPU 78. In addition, the memory unit 76 may be used for storing temporary variables or other intermediate information during the execution of instructions by the CPU 78. The computer system 70 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 78.

The computer system 70 may also include a disk controller coupled to the bus B to control one or more storage devices for storing information and instructions, such as mass storage 74 which may be a hard disk drive, for example, and drive device 82 (e.g., floppy disk drive, read-only compact disc drive, read/write compact disc drive, compact disc jukebox, tape drive, flash memory or a flash memory based drive, and removable magneto-optical drive). The storage devices may be added to the computer system 70 using an appropriate device interface (e.g., small computer system interface (SCSI), integrated device electronics (IDE), enhanced-IDE (E-IDE), direct memory access (DMA), or ultra-DMA).

The computer system 70 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 70 may also include a display controller coupled to the bus B to control a display, such as a cathode ray tube (CRT), organic light emitting diode (OLED) display, liquid crystal display (LCD), or projector, for displaying information to a computer user. The computer system may include input devices, such as a keyboard, pointing device, or touch display, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system 70 performs a portion or all of the processing steps in response to the CPU 78 executing one or more sequences of one or more instructions contained in a memory, such as the memory unit 76. Such instructions may be read into the memory unit 76 from another computer-readable medium, such as the mass storage 74 or a removable media 72. One or more processors in a multi-processing arrangement may also be employed to execute the sequences of instructions contained in the memory unit 76 or the removable media 72. In alternative embodiments, hard-wired circuitry may be used in place of or in combination with software instructions. Thus, embodiments are not limited to any specific combination of hardware circuitry and software.

As stated above, the computer system 70 includes at least one removable media 72, which is a computer-readable medium, or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other storage medium from which a computer can read.

Stored on any one or on a combination of computer-readable media is software for controlling the computer system 70, for driving a device or devices, and for enabling the computer system 70 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 78 for execution. A computer-readable medium may take many forms, including but not limited to, non-volatile media, and volatile media. Non-volatile media includes, for example, optical, magnetic disks, and magneto-optical disks, such as the mass storage 74 or the removable media 72. Volatile media includes dynamic memory, such as the memory unit 76.

Various forms of computer-readable media may be involved in carrying out one or more sequences of one or more instructions to the CPU 78 for execution. For example, the instructions may initially be carried on a magnetic disk of a remote computer. The remote computer can load the instructions remotely into a dynamic memory and send the instructions over a telephone line using a modem. A modem local to the computer system 70 may receive the data on the telephone line and use an infrared transmitter to convert the data to an infrared signal. An infrared detector coupled to the bus B can receive the data carried in the infrared signal and place the data on the bus B. The bus B carries the data to the memory unit 76, from which the CPU 78 retrieves and executes the instructions. The instructions received by the memory unit 76 may optionally be stored on mass storage 74 either before or after execution by the CPU 78.

The computer system 70 also includes a communication interface 80 coupled to the bus B. The communication interface 80 provides a two-way data communication coupling to a network that is connected to, for example, a LAN, or to another communications network such as the Internet. For example, the communication interface 80 may be a network interface card to attach to any packet switched LAN. As another example, the communication interface 80 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 80 sends and receives electrical, electromagnetic, or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 80, which carry the digital data to and from the computer system 70 may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 70 can transmit and receive data, including program code, through the network and the communication interface 80. Moreover, the network may provide a connection to a mobile device such as a personal digital assistant (PDA) laptop computer, or cellular telephone.

Alternatively, the client device 24 may be implemented in a digital copier/printer multi-function machine (MFP), as further discussed below. For example, the client device 24 may capture an image, which is transmitted to the printing device 30 for outputting. Further, the one or more associate devices 46 may be incorporated in the printing device 30, in which case the one or more users may retrieve the authentication information directly from the printing device 30.

Figure 4A:
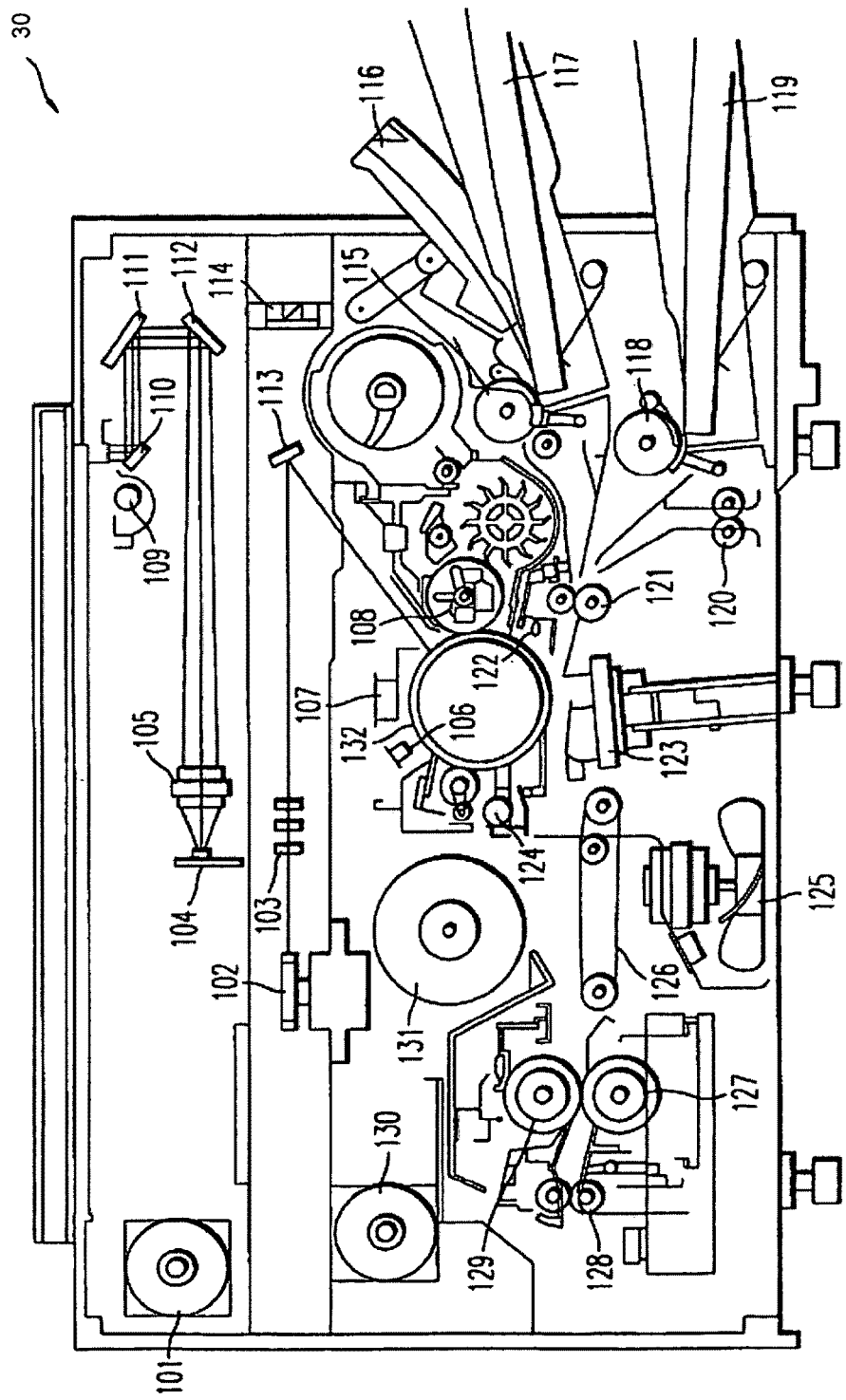
FIG. 4A illustrates hardware components of an exemplary printing device.

FIG. 4A illustrates an exemplary mechanical layout of the printing device 30 illustrated in FIG. 2, which may correspond to a digital copier/printer multi-function machine (MFP). In FIG. 4A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the printing device 30, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

FIG. 4B illustrates a block diagram of the electronic components of the printing device 30 illustrated in FIG. 4A. The CPU 160 is a microprocessor and acts as the system controller. There is a random access memory (RAM) 162 to store dynamically changing information including operating parameters of the digital copiers. A read-only memory (ROM) 164 stores the program code used to run the printing device 30 and also information describing the static-state data such as model number, serial number, and default parameters that would not change over the life of the machine. When the device needs to boot up from either a hard disk or flash memory, the ROM memory 164 stores the boot sequence.

Similar to the computer system 70 discussed above, the printing device 30 may perform a portion or all processing steps in response to the CPU 160 executing one or more sequences of one or more instructions contained in a memory, such as the ROM 164 or of one of the memory types discussed above with respect to the computer system 70. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the printing device 30 to communicate with external devices. Reference numeral 168 represents a telephone or other communication line including a wireless channel. Reference number 170 represents a wired communication line, such as a wired telephone or Ethernet connection. Further information of the multi-port communication interface is described with respect to FIG. 4C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display, or other displays as discussed above, may be included within the operation panel 174 to display parameters and messages of the apparatus. The operation panel also can be a touch panel in which the display and function buttons may change according to the context.

A local connection interface 171 is a connection through local port such as RS232, USB and IEEE 1394. This interface 171 allows external devices to be attached to the apparatus.

A storage interface 176 connects storage devices to the system bus 186. The storage devices include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 4B, the various sections making up the printing device 30 are illustrated. Reference numeral 202 designates a sorter and contains sensors and actuators used to sort the output of the printing device 30. There is a duplexer 200 that allows a duplex operation to be performed and includes conventional sensors and actuators. The printing device 30 includes a large capacity tray unit 198 that allows paper trays holding a large number of sheets to be used. The large capacity tray unit 198 includes conventional sensors and actuators.

A paper feed controller 196 is used to control the operation of feeding paper into and through the printing device 30. A scanner 194 is used to scan images into the printing device 30 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the printing device 30 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the printing device 30.

Figure 4C:
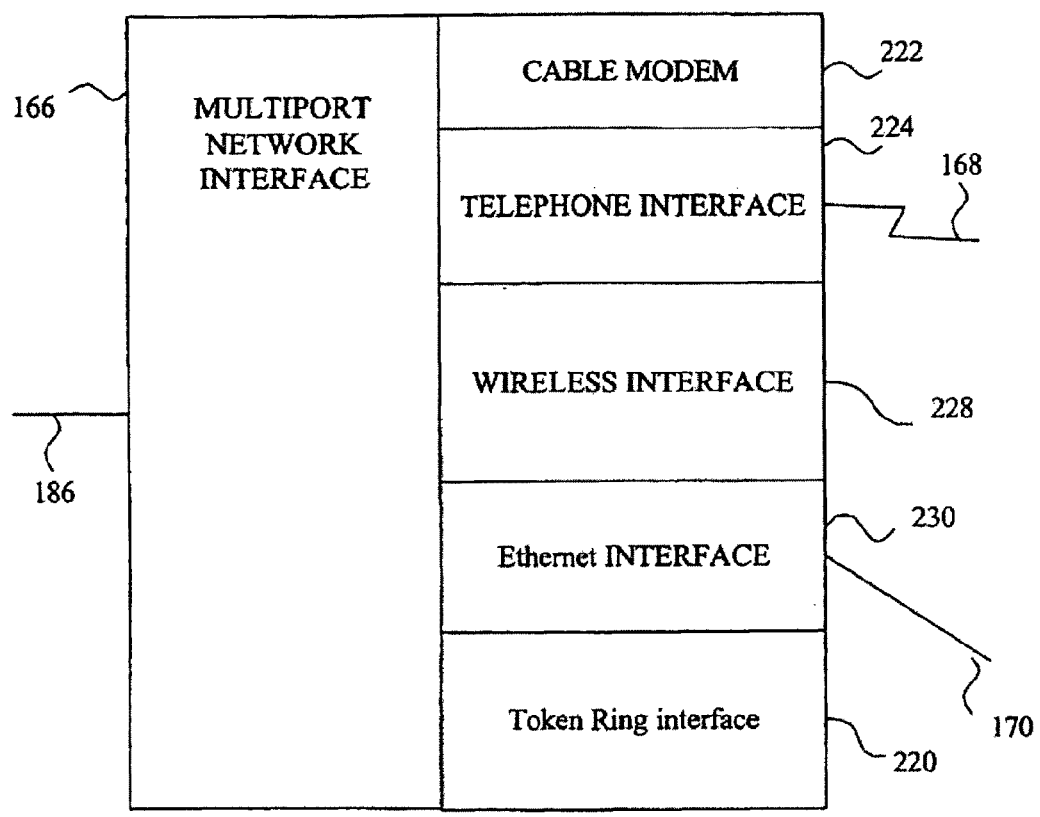
FIG. 4C illustrates details of the multi-port communication interface illustrated in FIG. 4B.

FIG. 4C illustrates details of the multi-port network interface 166. The printing device 30 may communicate to external devices through a Token Ring interface 220, a cable modem unit 222 that has a high speed connection over cable, a conventional telephone interface 224 that connects to a telephone line 168, wireless interface 228, and an Ethernet interface 230. Other interfaces (not shown) include, but are not limited to, a Digital Subscriber line. The multi-port network interface does not need to have all the interfaces described in FIG. 3C.

The CPU or other microprocessor or circuitry executes a monitoring process to monitor the state of each of the sensors of the printing device 30, and a sequencing process is used to execute the instructions of the code used to control and operate the printing device 30. Additionally, there is (1) a central system control process executed to control the overall operation of the printing device 30 and (2) a communication process used to assure reliable communication to external devices connected to the printing device 30. The system control process monitors and controls data storage in a static state (e.g., the ROM 164 of FIG. 4B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to store data for future processing.

Figure 4D:
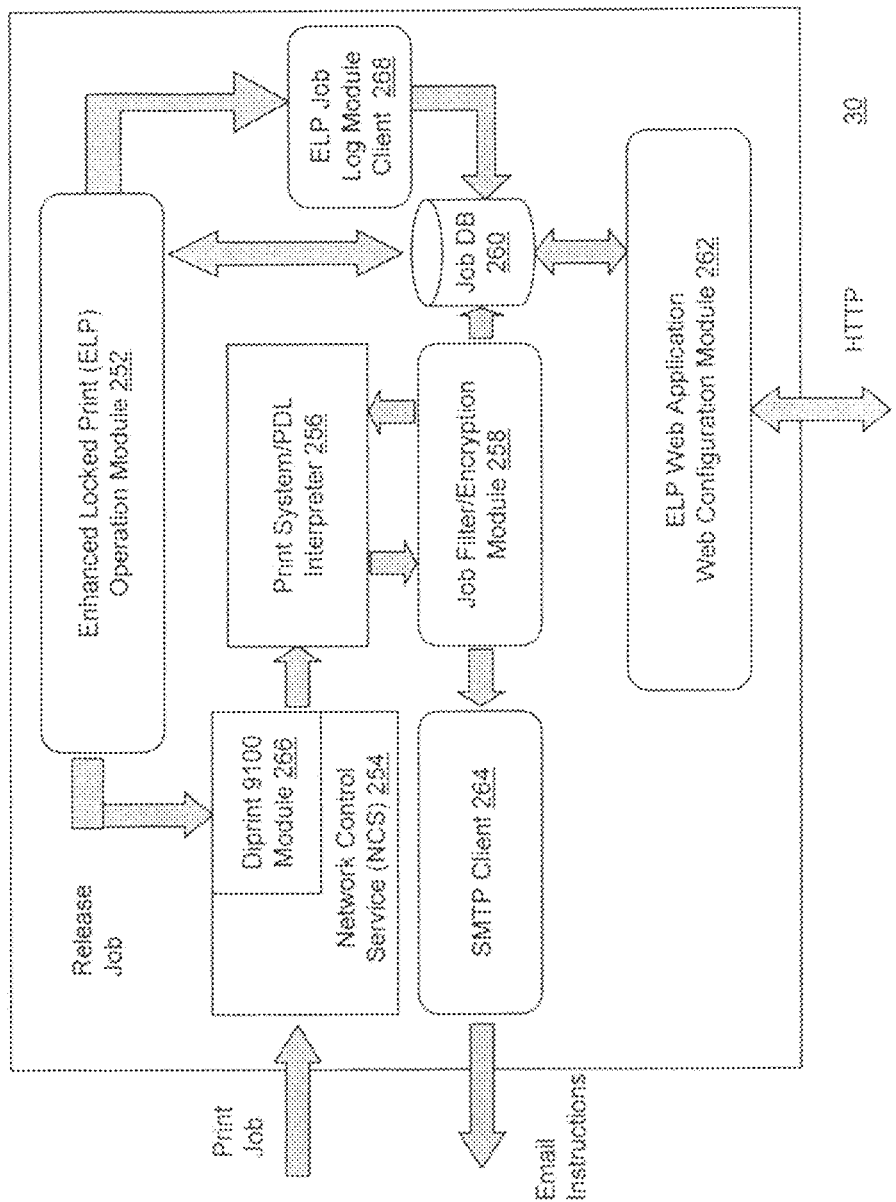
FIG. 4D illustrates an exemplary software application for the printing device.

FIG. 4D illustrates a flow diagram between electronic components in an exemplary embodiment of the printing device 30. As illustrated in FIG. 4D, a network control service (NCS) 254 receives a print job from the printer driver 28 of the client device 24, which is connected to a TCP port of the printing device 30. The print job includes authentication information generated by the printer driver 28 that is sent as encrypted data to the printing device 30. The NCS 254 includes Diprint 9100 module 266, which monitors port 9100 for TCP print jobs from the client device 24, and controls communications over the network. However, in alternate embodiments, the Diprint 9100 module 266 may be configured to monitor one or more other port numbers. After receiving the print job, the NCS 254 transfers the print job to print system/printer description language (PDL) interpreter 256, which forwards the print job to the job filter/encryption module 258.

The job filter/encryption module 258 determines whether the print job is to be distributed to one or more users. If the print job is to be distributed to one or more users, the job filter/encryption module 258 extracts e-mail information from the print job and sends the extracted e-mail information to a Simple Mail Transfer Protocol (SMTP) Client 264, which e-mails the authentication information based on the extracted e-mail information. Further, the job filter/encryption module 258 determines if the print job has been locked. If the print job has been locked, the job filter/encryption module 258 stores the print job in job DB 260. The job filter/encryption module 258 may encrypt the print job prior to storing the print job in the job DB 260. If the job filter/encryption module 258 determines that the print job is not to be distributed to one or more users and locked, the job filter/encryption module 258 returns the print job to the print system/PDL interpreter 256, which interprets print data, e.g., PDL data included in the print job, and prints the print data associated with the print job.

Figure 16A:
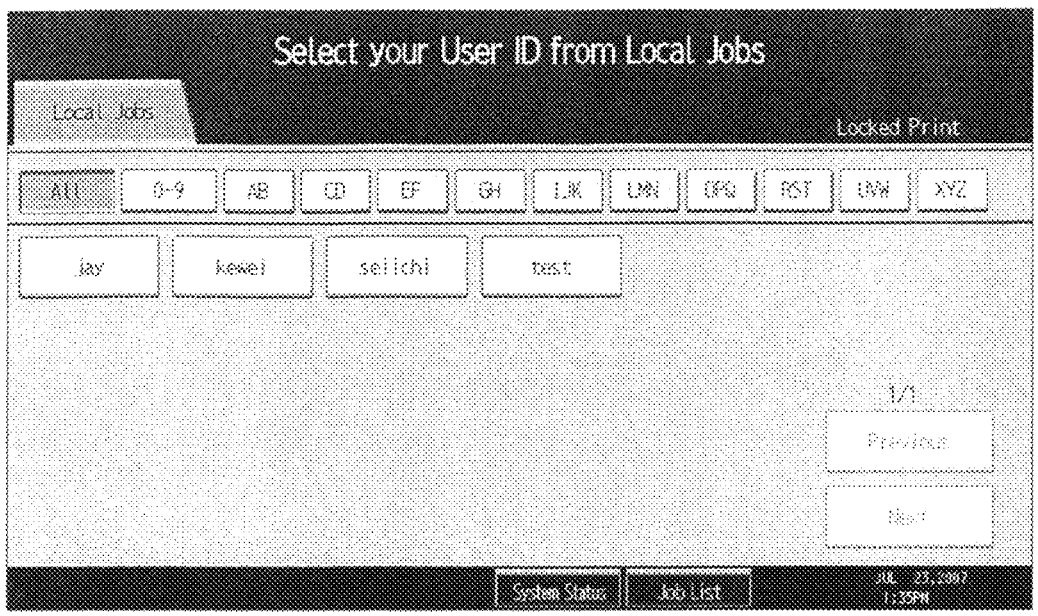
Figure 16B:
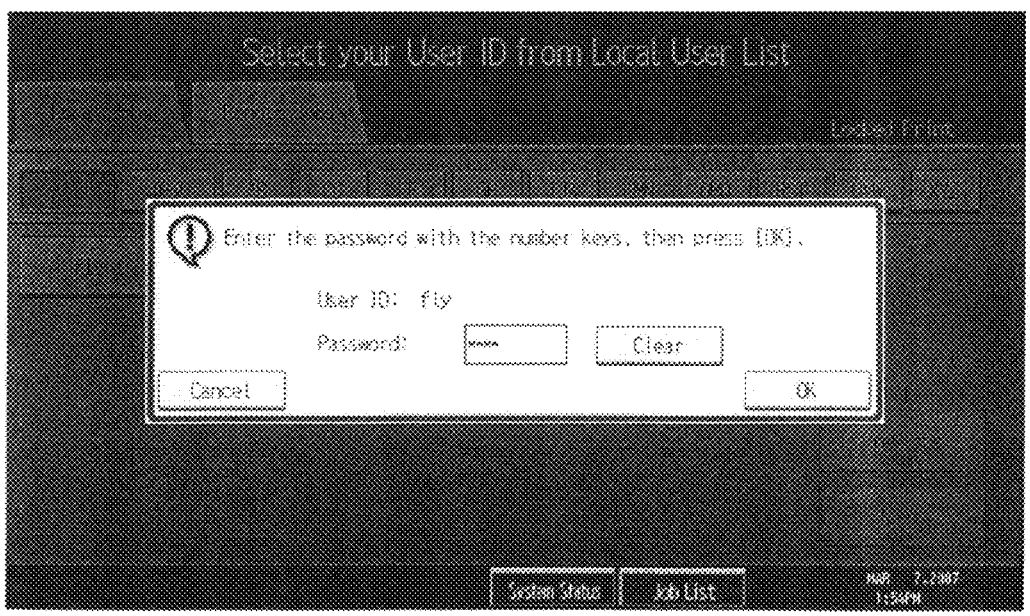
Figure 16C:
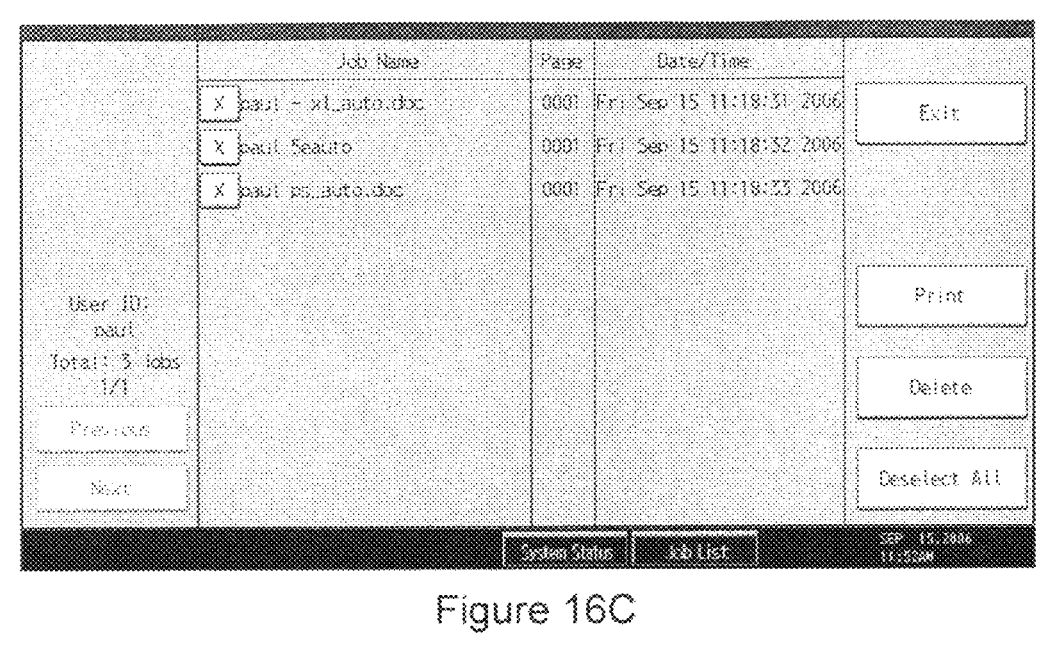

Enhanced locked print (ELP) operation module 252 is configured to provide an interface for a user to access locked print jobs stored in the printing device 30. When the user operates the ELP operation module 252, the user enters a user ID and corresponding authentication information. FIG. 16A illustrates an exemplary interface for the user to select the user ID, and FIG. 16B illustrates an exemplary interface for the user to enter the corresponding authentication information. After the user ID and authentication information are inputted by the user, the ELP operation module 252 retrieves print jobs associated with the user ID from the job DB 260. The retrieved print jobs are displayed to the user, for example, as illustrated in FIG. 16C. After a particular print job is selected by the user, the ELP operation module 252 pulls the selected print job from the job DB 260 and sends the print job to the Diprint 9100 module 266. The Diprint 9100 module 266 forwards the print job to the print system/PDL interpreter 256, which prints the print data associated with the print job. When, the print system/PDL interpreter 256 is aware that the print job is unlocked, the print job is printed without forwarding to the job filter/encryption module 258.

Figure 15:
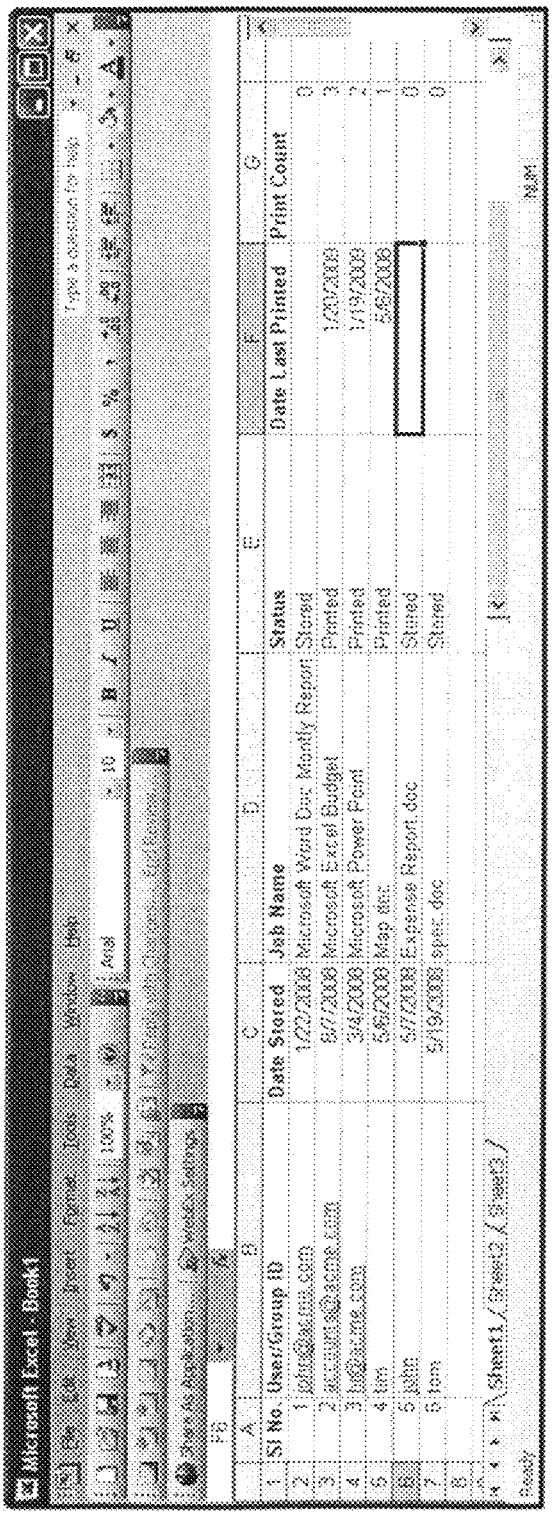
FIG. 15 illustrates exemplary job logging data in a Comma Separated Value (CSV) file.

The ELP job log module client 268 logs information regarding the print jobs printed and/or stored by the printing device 30. The logged information may include, for example, user/group ID, date/time stored, job name, status of the print job (e.g., stored/printed), date/time the print job was last printed, number of times printed (or print count), etc. The logged information may be stored in the storage 40 of the printing device 30, and accessed through the ELP web application web configuration module 262. The information can also be downloaded as a CSV file for auditing purposes. An exemplary CSV file is illustrated in FIG. 15.

The ELP web application web configuration module 262 may connect to an administrator application using the hypertext transfer protocol (HTTP). However, the administrator application may connect to the ELP web application web configuration module 262 using other communication protocols such as the file transfer protocol (FTP) or the simple object access protocol (SOAP). The administrator application may connect to the ELP web application web configuration module 262 to manage the print jobs stored on the printing device 30, or to access status information such as the job log stored on the printing device 30, as further discussed below.

Figure 5:
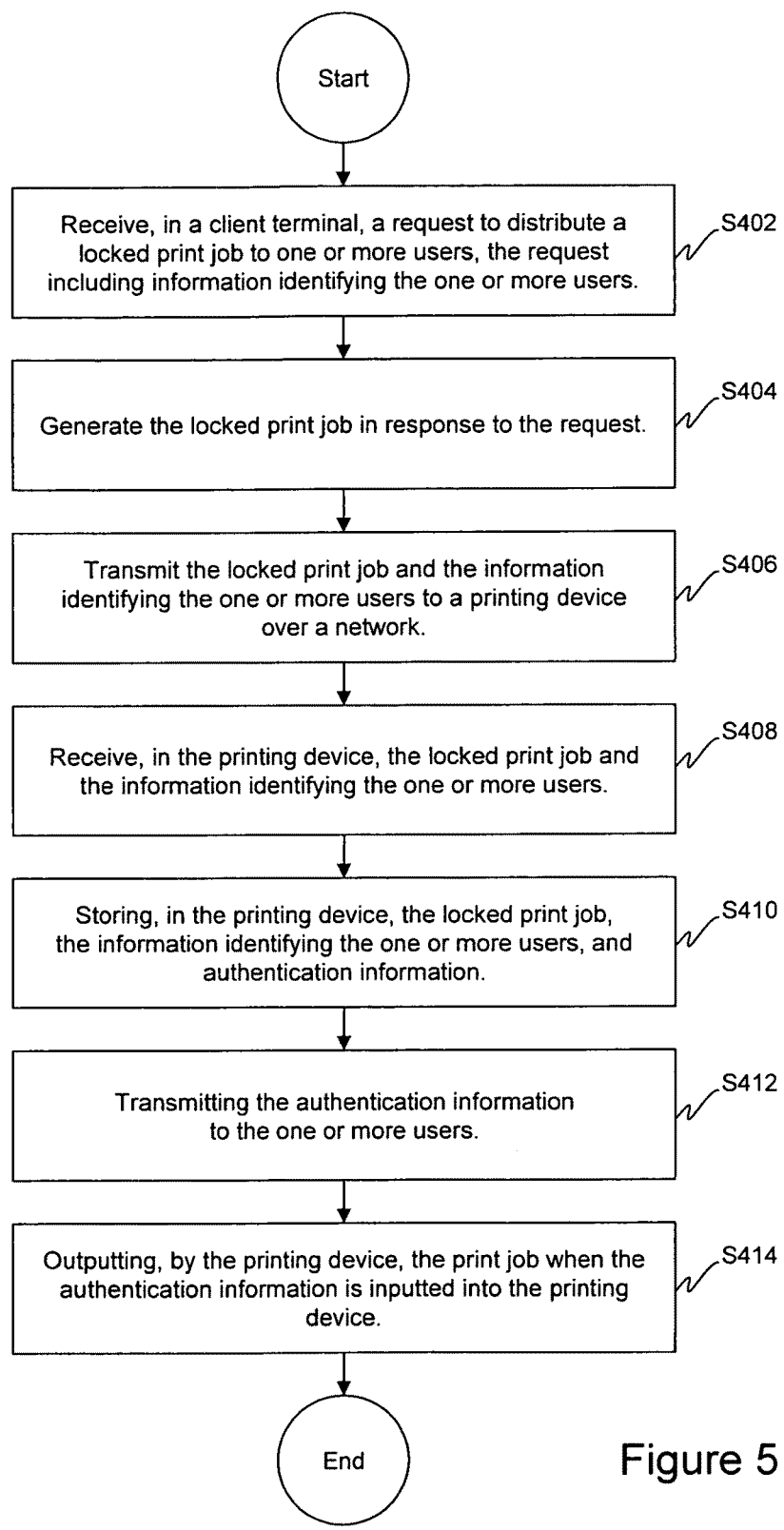
FIG. 5 illustrates a flow diagram of distributing a locked printing process according to one embodiment.

FIG. 5 provides an overview of a process for distributing a print job to one or more users. In step S402, the client device 24 (also referred to as a client terminal) receives, from a user of the client device 24, a locked print job request including information identifying one or more users to whom the locked print job is to be distributed. A locked print job is generated in response to the locked print job request, in step S404. Further, the locked print job and the information identifying the one or more users are transmitted to the printing device 30, which is connected to the client device 24 over the network, in step S406. In step S408, the printing device 30 receives the locked print job and the information identifying the one or more users. The printing device 30 stores the locked print job, the information identifying the one or more users, and authentication information, in step S410. The authentication information may be generated by the printing device 30, or generated and transmitted to the printing device 30 by the client device 24. In step S412, the authentication information is transmitted to the one or more users (e.g., the associate devices 46). The authentication information may be transmitted to the one or more users by either the client device 24 or the printing device 30. After step S412, the printing device 30 outputs the print job when the authentication information is inputted into the printing device 30, in step S414. The outputting of the print job may include any of printing, forwarding to another device, or faxing. In one embodiment, the inputting of the authentication information may simply allow the one or more users to access the print job stored in the printing device 30. The one or more users may then select an appropriate process to be performed on the print job.

Figure 6:
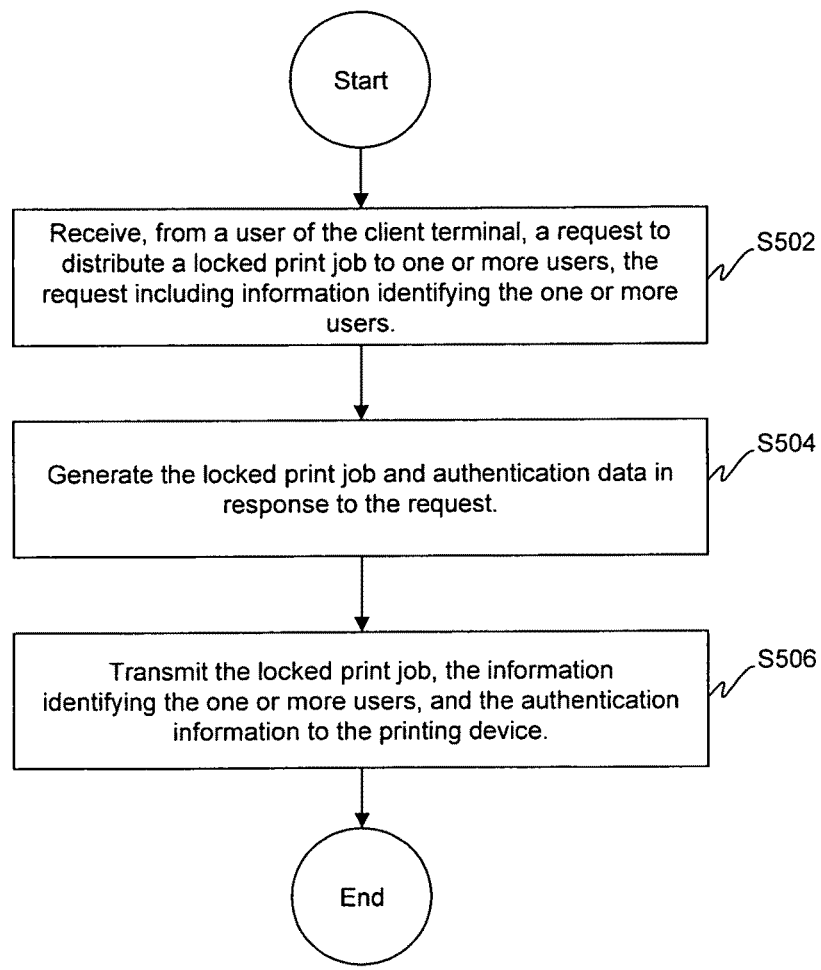
FIG. 6 illustrates a flow diagram of one embodiment for distributing a locked print job by the client device.

FIG. 6 illustrates a process performed by the client device 24 to request a distributed locked print job. In step S502, the client device 24 receives a request to distribute a locked print job from a user of the client device 24. The request includes information identifying one or more users to whom the locked print job is to be distributed. As noted above, the information identifying one or more users may include, for example, any one or a combination of e-mail addresses, telephone numbers, network identifiers, user IDs, group IDs, instant messaging identifiers, look-up table identifiers, or other identifiers that may be used to identify the one or more users. The client device 24 generates the locked print job and authentication information in response to the request from the user, in step S504. Further, in step S506, the client device 24 transmits the locked print job, the information identifying the one or more users, and the authentication information to the printing device 30. However, as noted above, the authentication information is not required to be generated by the client device 24. Rather, the authentication information may be generated by the printing device 30 in response to receipt of the locked print job from the client device 24.

Figure 7:
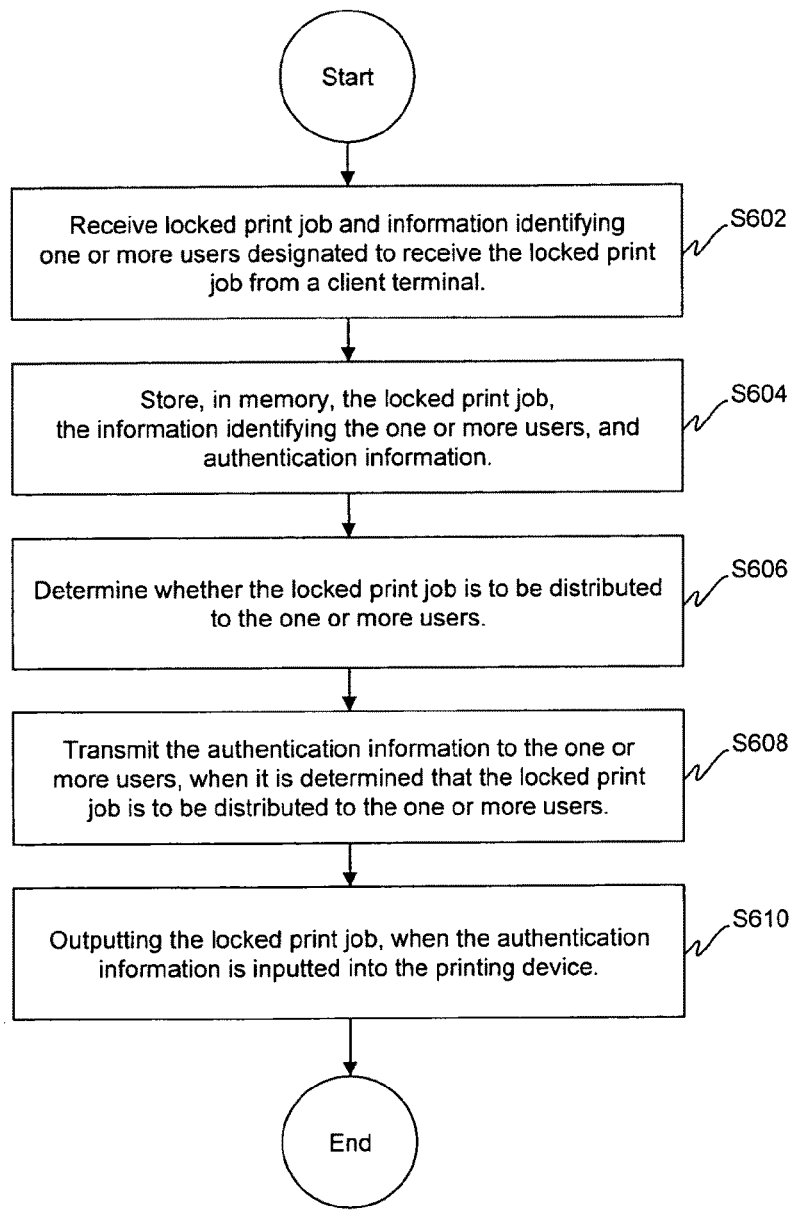
FIG. 7 illustrates a flow diagram of one embodiment for performing a distributed locked print job in the printing device.

FIG. 7 illustrates an exemplary process performed by the printing device 30. As illustrated in FIG. 7, the printing device 30 receives the locked print job and information identifying the one or more users to whom the locked print job is to be distributed, from the client device 24, in step S602. In step S604, the printing device 30 stores the locked print job, the information identifying the one or more users, and authentication information in a memory. Next, the printing device 30 determines whether the locked print job is to be distributed to one or more users, in step S606. If the locked print job is determined to be distributed to the one or more users, in step S606, the printing device 30 transmits the authentication information to the one or more users and, if necessary, other information such as a user ID or any other identifier associated with the locked print job (e.g., a document name), in step S608. The printing device 30 may transmit the authentication information to the one or more users by, for example, transmitting the authentication information to one or more associate devise 46 associated with the one or more users. However, as noted above, in an alternate embodiment, the authentication information may be transmitted to the one or more associate devices 46 directly from the client device 24.

In step S610, the printing device 30 outputs the locked print job, when the authentication information is inputted into the printing device 30.

Figure 8:
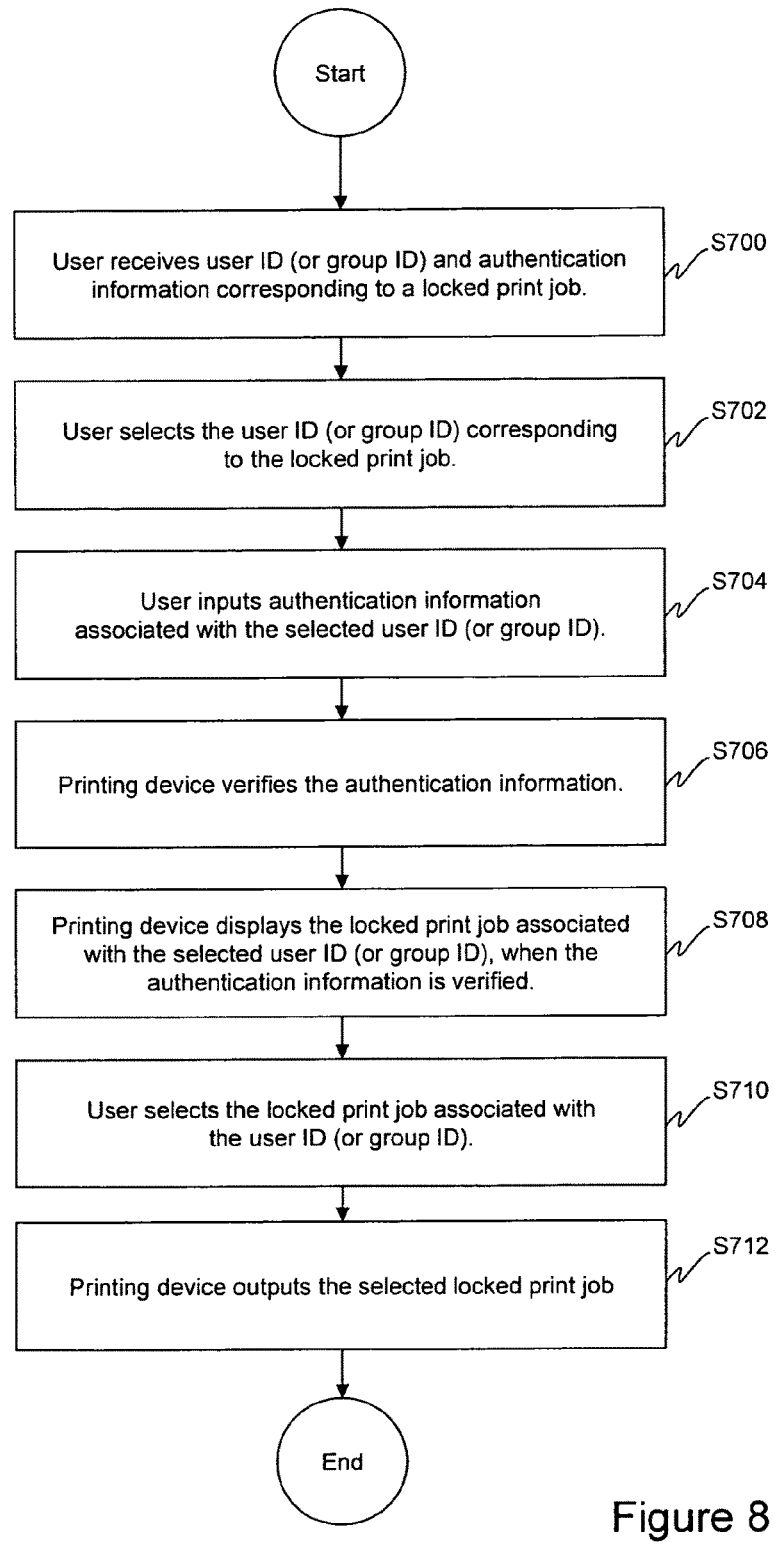
FIG. 8 illustrates a flow diagram of one embodiment for unlocking a locked print job stored in the printing device.

FIG. 8 illustrates a process for unlocking a locked print job stored in the printing device 30. In step 700, a user of the one or more users receives a user ID (or group ID) and authentication information corresponding to a locked print job. In step S702, the user of the one or more users selects a user ID corresponding to a locked print job. The user inputs the authentication information associated with the selected user ID in step S704. As discussed above, the user ID and/or authentication information are sent to the one or more users by the client device 24 or printing device 30. In step S706, the printing device 30 verifies the authentication information. The printing device 30 may verify the authentication information by comparing the user ID and authentication information to user IDs and authentication information stored in the printing device 30. When the user ID and authentication information is validated, the printing device 30 displays one or more locked print jobs associated with the user ID, in step S708. In step S710, the user of the one or more users selects a displayed locked print job associated with the user ID, and the printing device outputs the selected locked print job in step S712. In alternate embodiments, the user ID (or group ID) may be replaced with any other identifier associated with the locked print job (e.g., a document name) and/or that uniquely identifies the user or a group to which the user is a member.

Figure 9:
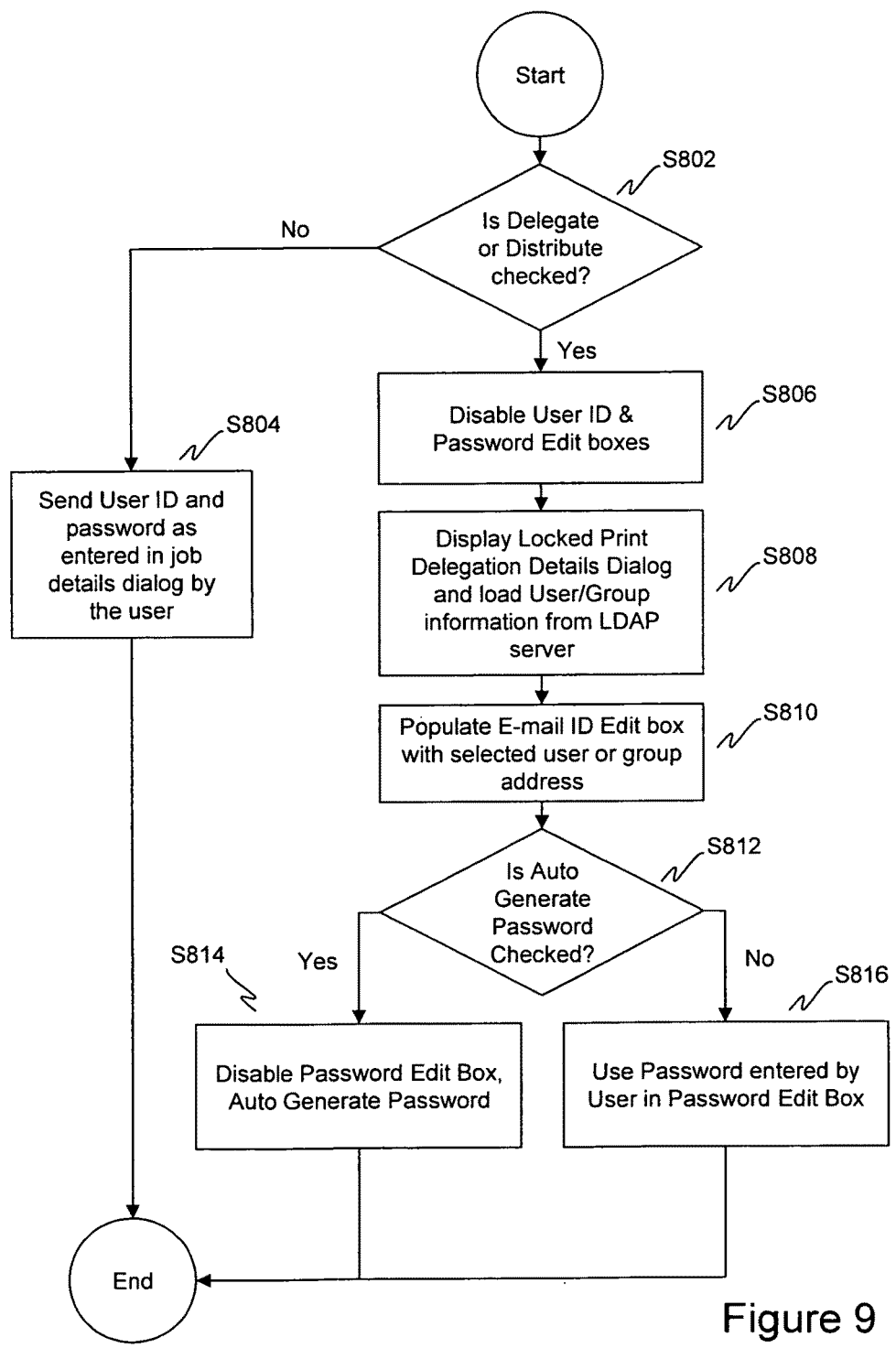
FIG. 9 illustrates a flow diagram for generating a unlocked/locked print job request by the client device.

FIG. 9 illustrates a process for generating the locked print job and authentication information, as illustrated in step S504 of FIG. 6. As illustrated in FIG. 9, the client device 24 determines whether a user has checked (or otherwise selected) the Delegate or Distribute option for a print job request, in step S802. If the Delegate or Distribute option is not selected, the client device 24 transmits a user ID and password, in step S804. In one embodiment, the user ID and password may be entered by a user using the interface illustrated in FIG. 11C. However, if the Delegate or Distribute option is determined to be checked by the user, in step S808, the client device 24 disables the user ID and password edit boxes, for example, as illustrated in FIG. 11C. In step S808, a Locked Print Delegation Details Dialog is displayed, and user and/or group information is loaded from the LDAP server 50. The Locked Print Delegation Details Dialog may be automatically displayed in response to the user selecting the Delegate or Distribute option, or displayed upon user request. FIG. 11D illustrates one embodiment of the Locked Print Delegation Details Dialog 1080. Further, in step S810, the user selects one or more users to whom the locked print job is to be distributed.

The user may select the one or more users from the User/Group Address E-mail Address List 1088 of FIG. 11D, and the e-mail ID box 1082 populated with the selected user/group address or addresses. The one or more users may be identified by one or a plurality of e-mail addresses. The User/Group Address E-mail Address List 1088 may display user and/or group information from one or more LDAP servers. In one embodiment, a driver, such as the printer driver 28, contacts a LDAP server with search parameters entered by the user and lists the results obtained from the LDAP server in the User/Group E-mail Address List 1088. The driver can be configured to contact one or more LDAP servers, in which case the user selects the LDAP server to be searched by, for example, selecting LDAP Server1 button 1090 or LDAP Server2 button 1092. The user may perform a search of the user and/or group information by entering one or more search terms, for example, in the name box 1094 and e-mail address box 1096. After selecting an LDAP server and entering the search terms, the user may initiate the search by selecting the search button 1098.

In step S812, a determination is made as to whether a password for the locked print job should be generated automatically. For example, the client device 24 may determine that the password should be generated automatically when the auto generate password box 1086 of FIG. 11D has been selected. If the password is to be generated automatically, the client device 24 disables the password edit box 1084, for example as illustrated in FIG. 11D, and automatically generates the password in step S814. However, if the client device 24 determines that the password should not be generated automatically, the client device 24 uses a password entered by the user in the password edit box 1084.

Figure 10:
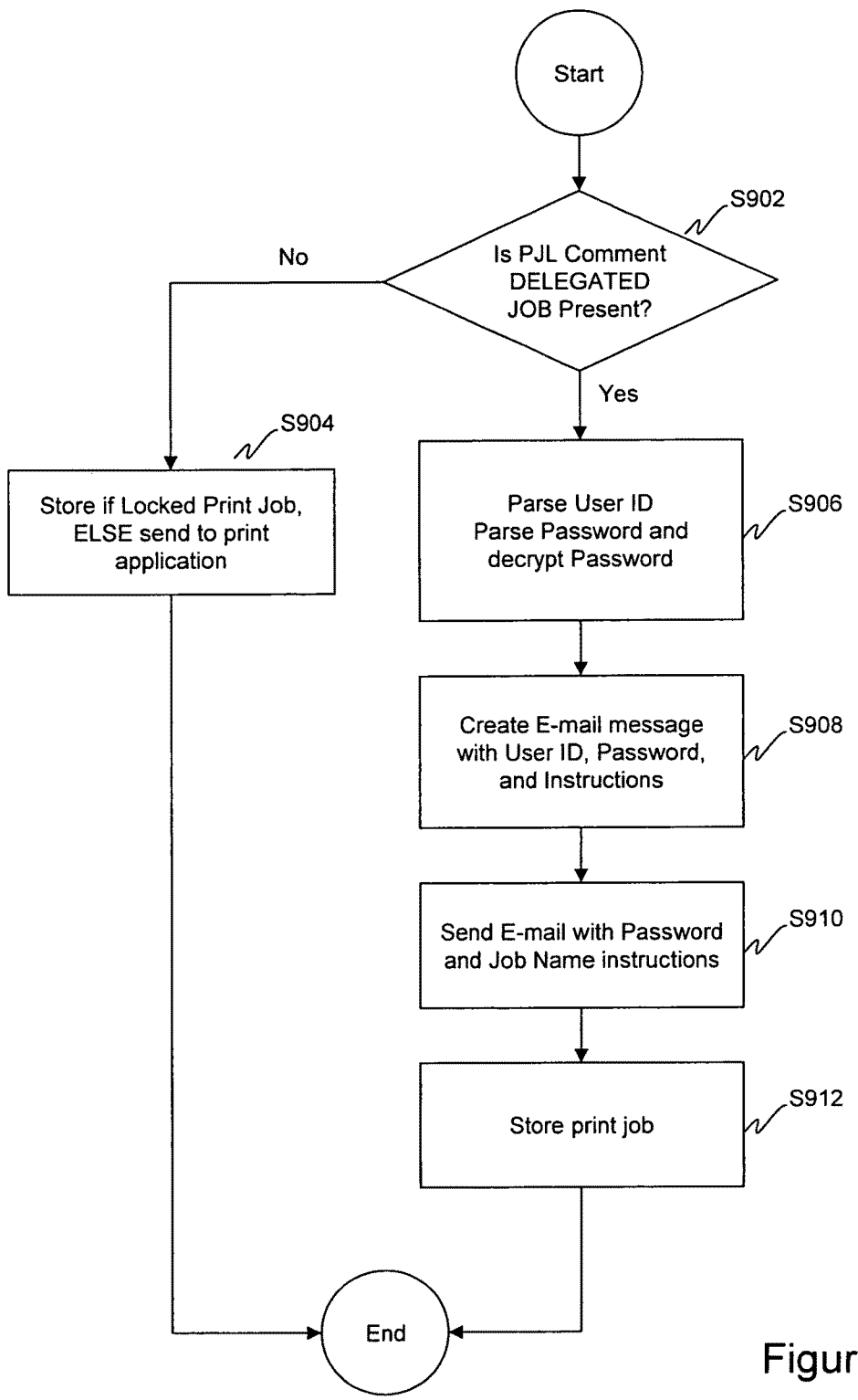
FIG. 10 illustrates a flow diagram for processing the unlocked/locked print job request in the printing device.

FIG. 10 illustrates an embodiment for processing a print job received by the printing device 30. The print job may include PJL commands/comments that are generated by the printer driver 28 of the client device 24. An exemplary set of PJL commands/comments generated by the printer driver 28, when the Delegate or Distribute option is checked is illustrated in FIG. 12. As illustrated in FIG. 10, the printing device 30 determines if a predetermined PJL comment (e.g., "Delegated Job") is present in the print job received by the printing device 30, in step S902. If the PJL comment is not present, the printing device 30 stores the print job, if the print job is of the locked printing type, or sends the print job to a print application to printed, if the print job is not of the locked printing type. However, when the predetermined PJL comment is determined to be present, the printing device 30 parses the PJL comments and extracts a user ID and password, in step S906. Further, in step S906, the printing device 30 may decrypt the password if necessary. The printing device 30 creates an e-mail message with the user ID, password, and instructions in step S908. The printing device 30 sends the message in an e-mail in step S910, and stores the print job in S912. However, it is noted that the print job need not be stored after parsing the comment in step S906 and creating and sending the email message in steps S908 and S910. Rather, in other embodiments, the print job may be stored before, or at the same time, the comment is parsed, or the e-mail is created and sent. Further, the PJL comments need not include both the user ID and password. Rather, the printing device 30 may parse either one of the user ID and the password from the PJL comments, based on need. Further, when the password is not included in the PJL comments, the password may be generated by the printing device 30.

FIG. 12 illustrates examples of PJL commands/comments generated by the print driver 28, when the Delegate or Distribute option is checked. FIG. 12 illustrates examples of PJL comments when the locked print job is to be distributed to a group of users (identified by a Group ID) or an individual user (identified by an Individual ID). As illustrated in FIG. 12, the PJL comments include a predetermined phrase to identify the print job as of the distributed type, a user ID identifying the group or individual, and an encrypted password. However, the PJL comments need not include all the above information.

Figure 13:
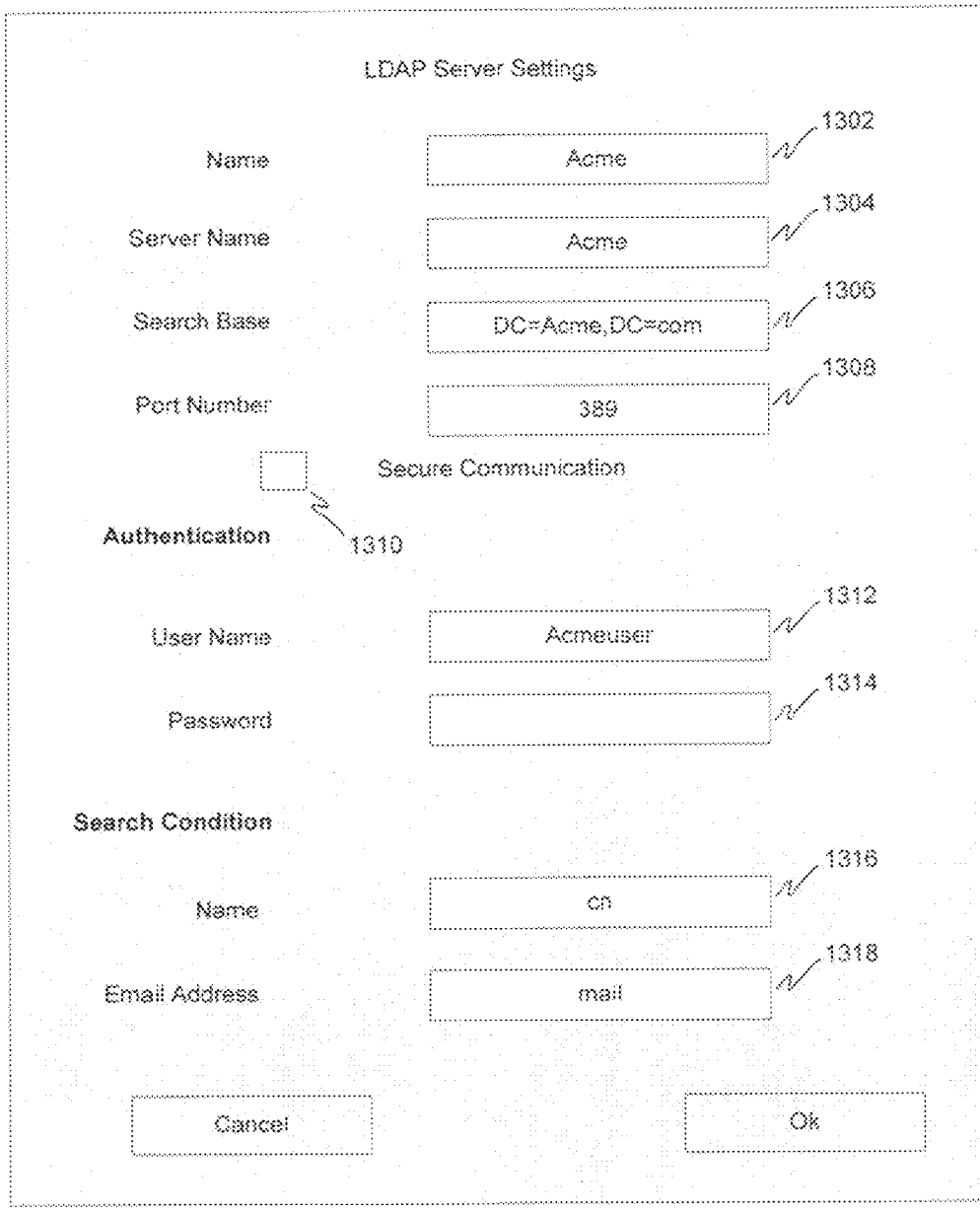
FIG. 13 illustrates exemplary LDAP server configuration settings.

FIG. 13 illustrates exemplary LDAP server configuration settings. Settings for one or a plurality of LDAP servers may be configured, for example, under "Printer Properties" of the printer driver 28. The LDAP server configuration parameters may include name 1302, server name 1304, search base 1306, port number 1308, SSL communication 1310, authentication related settings (e.g., user name 1312 and password 1314), and search condition settings (e.g., name 1316 and e-mail address 1318). The name 1302 corresponds to a name of the LDAP server. The name 1302 can be used as a label in driver properties, once the server is configured, such as the label LDAP Server1 corresponding to the button 1090 illustrated in FIG. 11D. The server name 1304 corresponds to the actual server IP address or network name (which can be resolved by a DNS server) of the LDAP server. Further, the search condition settings define the attributes corresponding to search conditions. For example, in FIG. 13, the directory searching may be based on "cn" (common name) or "mail" attributes, which results in E-mail addresses.

FIG. 13 also illustrates basic authentication parameters. However, other authentication method can also be supported by the LDAP server. For example, the authentication methods may include anonymous (i.e., no user ID or password required), simple (i.e., requires user ID and password), or Simple Authentication and Security Layer (SASL). SASL is a high security setting available on Ricoh multifunction copiers.

Figure 14A:
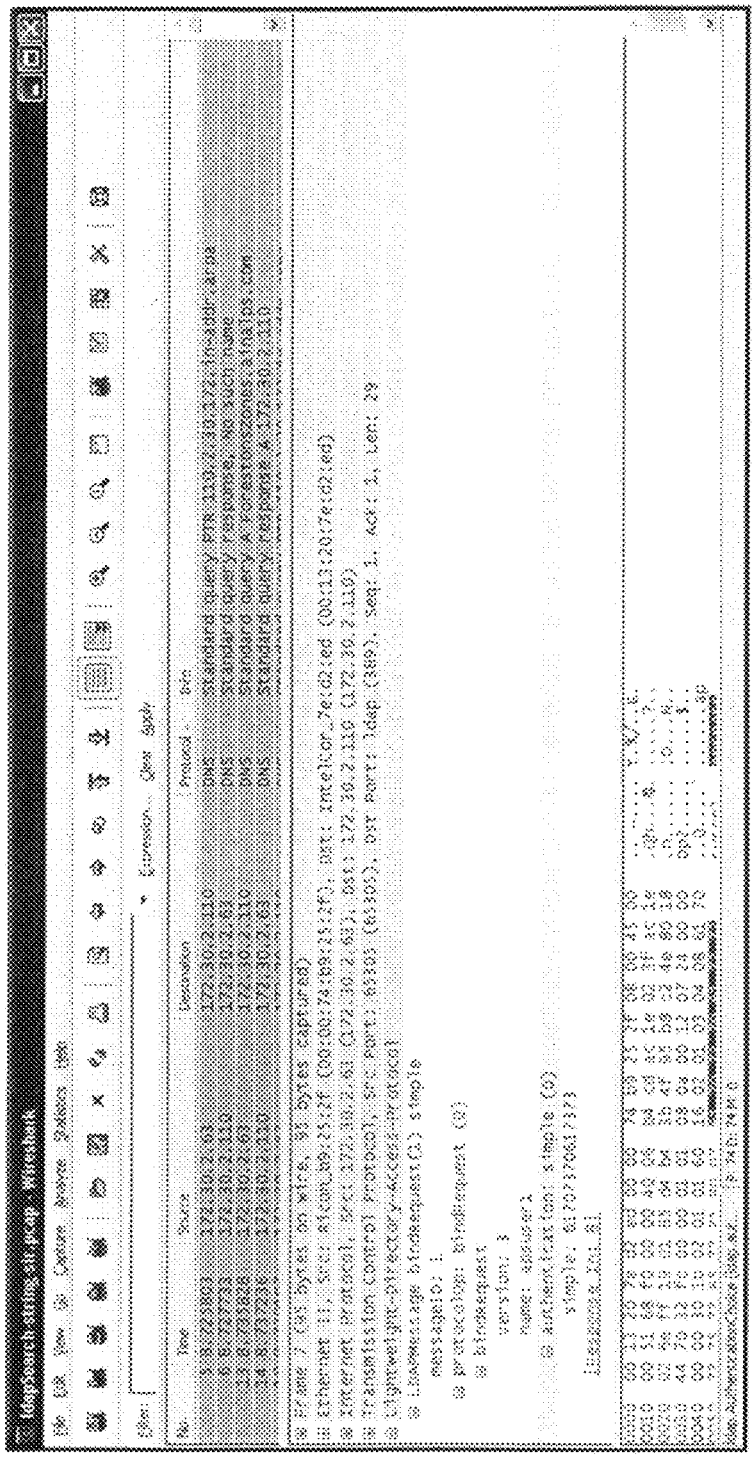
FIGS. 14A-14D illustrate an exemplary LDAP protocol sequence for performing a search from a driver to the LDAP server.
Figure 14B:
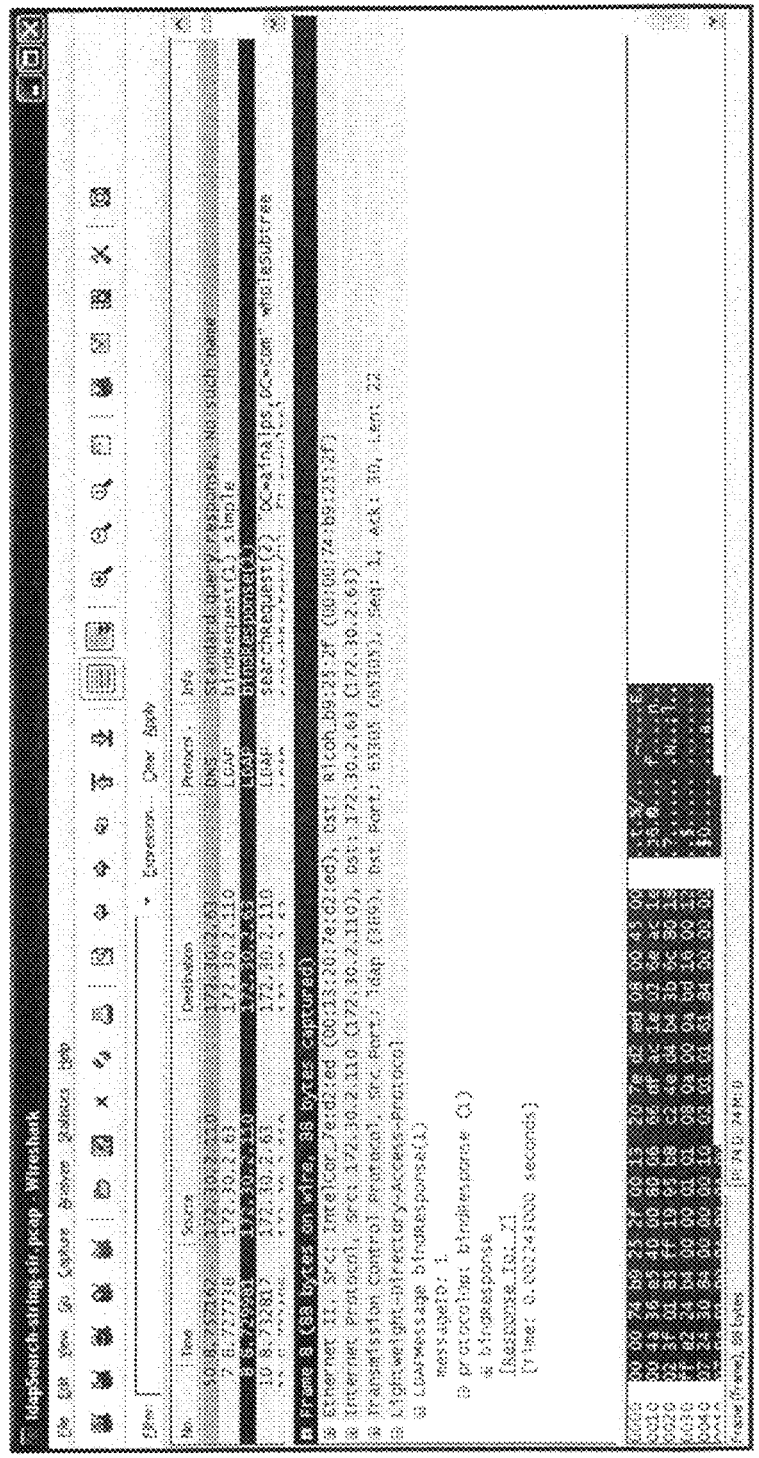
Figure 14C:
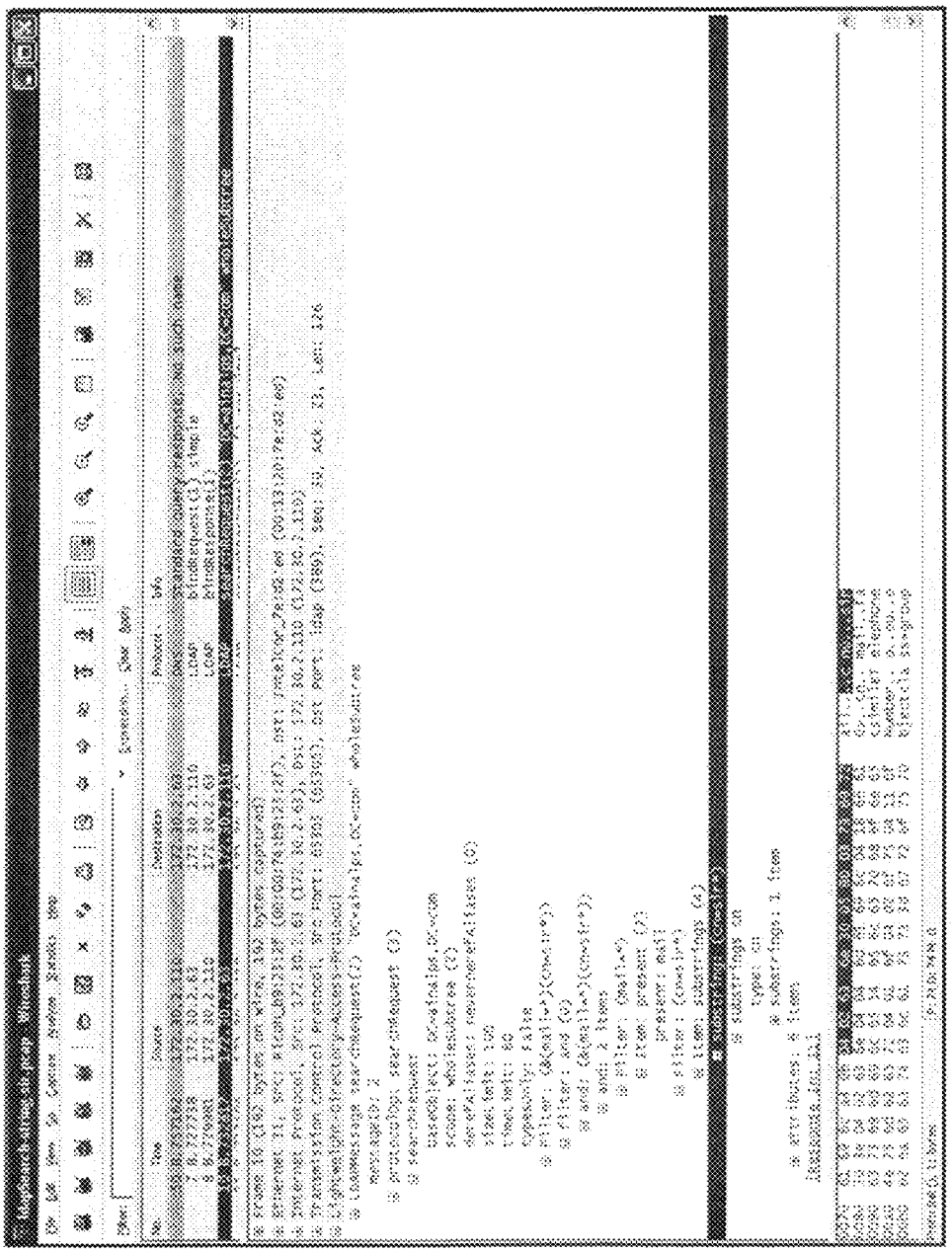
Figure 14D:
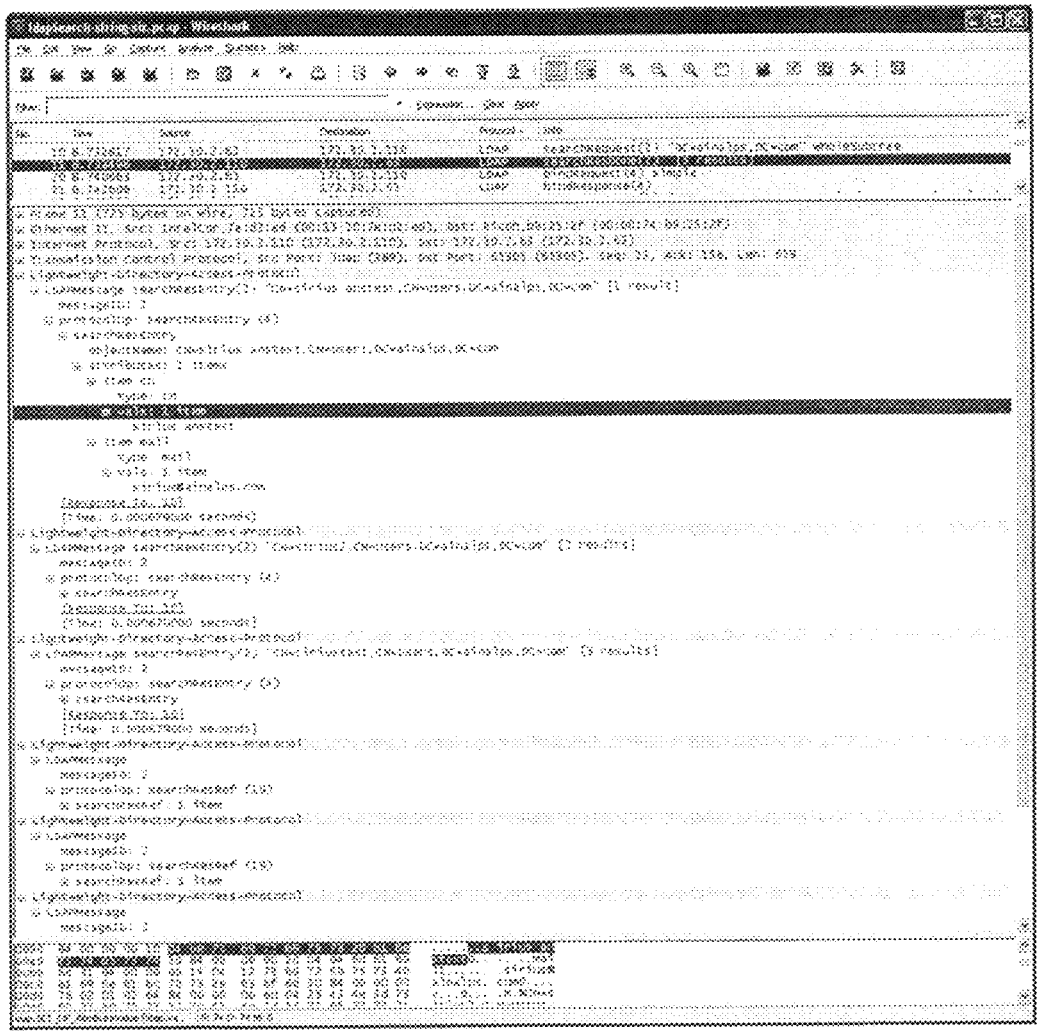

FIGS. 14A-14D illustrate a typical LDAP protocol communication sequence for a Driver to perform a search on a LDAP server. LDAP is specified in a series of Internet Engineering Task Force (IETF) Standard Track Requests for Comments (RFCs), as detailed in RFC 4510-4519, herein incorporated by reference in their entirety. FIG. 14A illustrates an exemplary LDAP Message bindRequest simple operation, which is a Bind operation that authenticates the printer driver 28 to the LDAP server 50. FIG. 14B illustrates an exemplary LDAP Message bindResponse operation, in which the LDAP server 50 responds to the Bind operation of the printer driver 28. FIG. 14C illustrates an exemplary search query from the printer driver 28 to the LDAP server 50. In this example, a Value of "sir" is entered in the name field for search. Further, FIG. 14D illustrates an exemplary response to the query from the print driver 28 by the LDAP server 50. In this example, three items were found in the LDAP server 50, which is sent to the printer driver 28. The printer driver 28 reads the response and displays e-mail addresses in an e-mail address list box, such as the User/Group E-mail Address List 1088 illustrated in FIG. 11D, for user selection.

FIG. 15 illustrates an example of the CSV file generated by the printing device 30. As illustrated in FIG. 15, the CSV file includes, for each print job, information regarding user/group ID, date stored, job name, print job status, date last printed, and print count. However, the CSV file is not so limited, and in other embodiments, may include additional information such as the time the print job was stored and/or last printed, as well as a date/time for each time the print job was printed.

Numerous modifications and variations of the present invention are possible in light of the above teachings. It is therefore to be understood that within the scope of the appended claims, the invention may be practiced otherwise than as specifically described herein.

The invention claimed is:

1. A method for printing a locked print job by a printing device connected to a client terminal over a network, the method comprising:
   receiving, in the client terminal, a request to distribute the locked print job to a plurality of users, the request including information identifying the plurality of users;
   generating, by the client terminal, the locked print job in response to the request, the locked print job including a print job language (PJL) command or comment identifying the locked print job as being distributed;
   transmitting, by the client terminal, the locked print job and the information identifying the plurality of users to the printing device over the network;
   receiving, in the printing device, the locked print job and the information identifying the plurality of users transmitted by the client terminal;
   storing, in the printing device, the locked print job, the information identifying the plurality of users, and authentication information, the authentication information being configured to unlock the locked print job when entered into the printing device;
   transmitting the authentication information to the plurality of users; and
   outputting, by the printing device, the locked print job, when the authentication information is entered into the printing device.

2. The method according to claim 1, further comprising:
   determining, by the printing device, whether the locked print job is to be distributed to the plurality of users, wherein
   the transmitting the authentication information step comprises transmitting, by the printing device, the authentication information to the plurality of users, only when the determining step determines that the locked print job is to be distributed to the plurality users.

3. The method according to claim 1, wherein
   the generating step comprises generating, by the client terminal, the locked print job and the authentication information in response to the request;
   the transmitting the locked print job step comprises transmitting, by the client terminal, the locked print job, the information identifying the plurality of users, and the authentication information to the printing device; and
   the receiving step comprises receiving, in the printing device, the locked print job, the information identifying the plurality of users, and the authentication information transmitted by the client terminal.

4. The method according to claim 1, wherein the transmitting the authentication information step comprises transmitting the authentication information in an e-mail message, based on the information identifying the plurality of users.

5. The method according to claim 1, wherein the generating step comprises automatically generating the authentication information in the client terminal.

6. The method according to claim 1, wherein the transmitting the authentication information step comprises transmitting, by the printing device, the authentication information to the plurality of users based on one or more destinations extracted from a PJL comment included in the locked print job.

7. The method according to claim 1, wherein the generating the locked print job step comprises generating the locked print job including a predetermined PJL comment that identifies the locked print job as being distributed.

8. A method for a printing device to print a locked print job, comprising:
   receiving the locked print job and information identifying a plurality of users designated to receive the locked print job from a client terminal;
   determining whether the locked print job is to be distributed to the plurality of users based on whether the locked print job includes a predetermined printer job language (PJL) command or comment;
   when the determining step determines that the locked print job is to be distributed to the plurality of users,
      transmitting the authentication information to the plurality of users, and
      storing, in a memory, the locked print job, the information identifying the plurality of users, and authentication information, the authentication information being configured to unlock the locked print job when entered into the printing device; and outputting the locked print job, when the authentication information is inputted into the printing device.

9. The method according to claim 8, wherein the transmitting step comprises transmitting the authentication information in an e-mail message, based on the information identifying the plurality of users.

10. The method according to claim 8, wherein the receiving step comprises receiving the authentication information that is automatically generated by the client terminal.

11. A printing device, comprising:

means for receiving a locked print job and information identifying a plurality of users designated to receive the locked print job from a client terminal;

means for determining whether the locked print job is to be distributed to the plurality of users based on whether the locked print job includes a predetermined printer job language (PJL) command or comment;

means for transmitting the authentication information to the plurality of users, when the means for determining determines that the locked print job is to be distributed to the plurality of users;

means for storing, in a memory, the locked print job, the information identifying the plurality of users, and authentication information, the authentication information being configured to unlock the locked print job when entered into the printing device; and means for outputting the locked print job, when the authentication information is inputted into the printing device.

12. The printing device according to claim 11, wherein the means for transmitting transmits the authentication information in an e-mail message, based on the information identifying the plurality of users.

13. The printing device according to claim 11, wherein the means for receiving receives the authentication information that is automatically generated by the client terminal.

* * * * *